United States Patent
Baek et al.

(10) Patent No.: US 12,245,164 B2
(45) Date of Patent: Mar. 4, 2025

(54) METHOD FOR SHARING POWER AND RESOURCES FOR SIDELINK POSITIONING, AND APPARATUS THEREFOR

(71) Applicant: LG ELECTRONICS INC., Seoul (KR)

(72) Inventors: Jongseob Baek, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 17/792,126

(22) PCT Filed: Jan. 11, 2021

(86) PCT No.: PCT/KR2021/000321
§ 371 (c)(1),
(2) Date: Jul. 11, 2022

(87) PCT Pub. No.: WO2021/141468
PCT Pub. Date: Jul. 15, 2021

(65) Prior Publication Data
US 2023/0101824 A1    Mar. 30, 2023

(30) Foreign Application Priority Data

Jan. 9, 2020  (KR) .................. 10-2020-0002999
Jan. 9, 2020  (KR) .................. 10-2020-0003021
(Continued)

(51) Int. Cl.
*H04W 52/28*  (2009.01)
*H04W 52/24*  (2009.01)
(Continued)

(52) U.S. Cl.
CPC .......... *H04W 52/28* (2013.01); *H04W 52/24* (2013.01); *H04W 52/32* (2013.01); *H04W 64/00* (2013.01); *H04W 72/20* (2023.01)

(58) Field of Classification Search
CPC ..... H04W 52/28; H04W 52/24; H04W 52/32; H04W 64/00; H04W 72/04
See application file for complete search history.

(56) References Cited

U.S. PATENT DOCUMENTS 9,964,626 B2 *  5/2018  Kim ................... G01S 5/0063
10,833,814 B2 *  11/2020  Hwang ............... H04L 5/0053
(Continued)

FOREIGN PATENT DOCUMENTS

CN      110545533      12/2019

OTHER PUBLICATIONS

Qualcomm Incorporated, "Feature Lead summary of In-device Coexistence Aspects in NR-V2X," 3GPP TSG-RAN WG1 Meeting #99, R1-1912948, Nov. 2019, 8 pages.
(Continued)

*Primary Examiner* — Hai V Nguyen
(74) *Attorney, Agent, or Firm* — LEE, HONG, DEGERMAN, KANG & WAIMEY

(57) ABSTRACT

The present invention relates to a method for sharing power and resources for on-demand sidelink positioning in a new radio-vehicle to everything (NR-V2X) communication system, and an apparatus therefor. A method by which a terminal shares power in a new radio-vehicle to everything (NR-V2X) communication system, according to one aspect, may comprise the steps of: configuring, in a physical sidelink feedback channel (PSFCH), transmission resources for HARQ-ACK feedback information (HFI) associated with an NR-V2X service and transmission resources for a positioning reference signal (PRS) associated with sidelink position-
(Continued)

ing; if transmissions of the PRS and the HFI are requested at the same time, allocating power on the basis of at least one from among priority corresponding to the PRS and priority corresponding to the HFI; and transmitting at least one from among the PRS and the HFI on the basis of the allocated power.

19 Claims, 19 Drawing Sheets

(30) Foreign Application Priority Data

Jan. 9, 2020 (KR) ............... 10-2020-0003033
Jan. 9, 2020 (KR) ............... 10-2020-0003047

(51) Int. Cl.
*H04W 52/32* (2009.01)
*H04W 64/00* (2009.01)
*H04W 72/20* (2023.01)

(56) References Cited

U.S. PATENT DOCUMENTS

| | | | | |
|---|---|---|---|---|
| 11,038,629 B2* | 6/2021 | Park | ............... | H04L 1/1812 |
| 11,411,688 B2* | 8/2022 | Hwang | ............... | H04L 5/0091 |
| 11,523,364 B2* | 12/2022 | Manolakos | ........... | H04W 48/12 |
| 11,601,225 B2* | 3/2023 | Park | ............... | H04L 5/0094 |
| 11,937,274 B1* | 3/2024 | Park | ............... | H04W 72/40 |
| 11,960,021 B2* | 4/2024 | Ko | ............... | H04W 72/04 |
| 12,035,203 B2* | 7/2024 | Kwak | ............... | H04W 92/18 |
| 12,058,649 B2* | 8/2024 | Zhou | ............... | H04L 5/0053 |
| 12,068,991 B2* | 8/2024 | Baek | ............... | H04L 5/0053 |
| 2011/0249578 A1* | 10/2011 | Nayeb Nazar | ........ | H04L 5/0053 370/252 |
| 2017/0085355 A1* | 3/2017 | Hayashi | ............... | H04L 5/0073 |
| 2020/0322095 A1* | 10/2020 | Park | ............... | H04W 4/40 |
| 2021/0242978 A1* | 8/2021 | Park | ............... | H04W 4/40 |
| 2022/0225290 A1* | 7/2022 | Ganesan | ............... | H04W 72/02 |
| 2022/0360307 A1* | 11/2022 | Matsumura | ........... | H04L 1/0026 |
| 2022/0407647 A1* | 12/2022 | Baek | ............... | H04L 5/0053 |
| 2023/0022915 A1* | 1/2023 | Bhamri | ............... | H04B 7/0408 |
| 2023/0062805 A1* | 3/2023 | Baek | ............... | H04W 64/00 |
| 2023/0076030 A1* | 3/2023 | Baek | ............... | H04W 24/10 |
| 2023/0171750 A1* | 6/2023 | Lee | ............... | H04L 5/005 370/329 |
| 2024/0224237 A1* | 7/2024 | Ganesan | ............... | H04W 72/563 |

OTHER PUBLICATIONS

CATT, "Sidelink physical layer procedures in NR V2X," 3GPP TSG-RAN WG1 Meeting #99, R1-1912159, Nov. 2019, 10 pages.
ZTE, "In-device coexistence between NR V2X and LTE V2X," 3GPP TSG-RAN WG1 #99, R1-1912555, Nov. 2019, 4 pages.
LG Electronics, "Discussion on in-device coexistence between LTE and NR sidelinks," 3GPP TSG-RAN WG1 Meeting #99, R1-1912591, Nov. 2019, 5 pages.
PCT International Application No. PCT/KR2021/000321, International Search Report dated Apr. 12, 2021, 3 pages.

* cited by examiner

FIG. 6
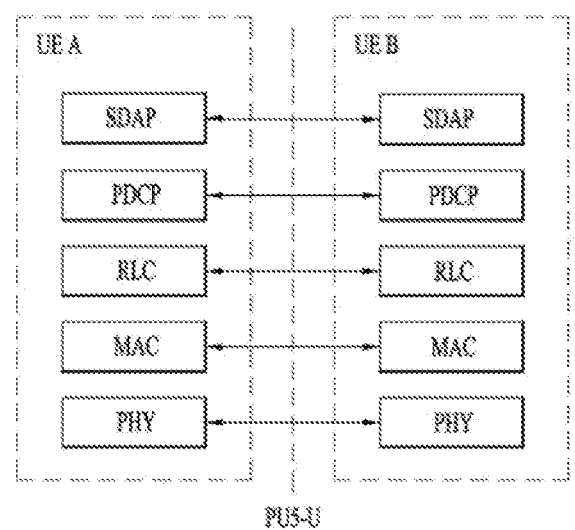
(a)
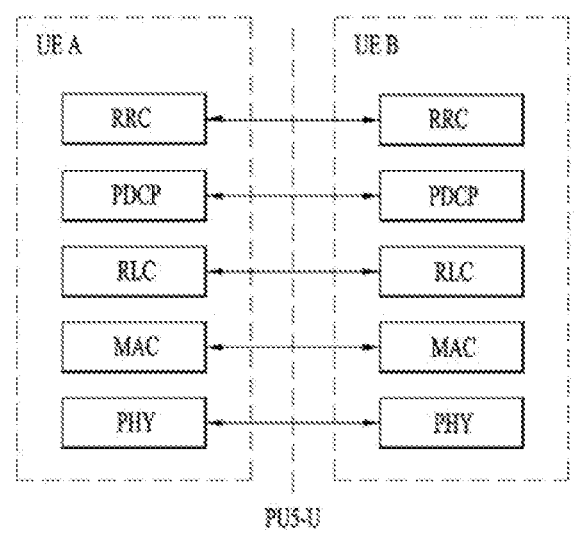
(b)

METHOD FOR SHARING POWER AND RESOURCES FOR SIDELINK POSITIONING, AND APPARATUS THEREFOR

CROSS-REFERENCE TO RELATED APPLICATIONS

This application is the National Stage filing under 35 U.S.C. 371 of International Application No. PCT/KR2021/000321, filed on Jan. 11, 2021, which claims the benefit of earlier filing date and right of priority to Korean Application Nos. 10-2020-0002999, filed on Jan. 9, 2020, 10-2020-0003021, filed on Jan. 9, 2020, 10-2020-0003033, filed on Jan. 9, 2020, and 10-2020-0003047, filed on Jan. 9, 2020, the contents of which are all incorporated by reference herein in their entireties.

TECHNICAL FIELD

The present disclosure relates to sidelink positioning, and more particularly to, a technology in which a user equipment (UE) performing sidelink positioning shares power and resources in a new radio vehicle-to-everything (NR-V2X) system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

In an NR-V2X system, UEs or a UE and an anchor node (AN) need to effectively provide control information related to positioning when sidelink positioning is performed.

Sidelink positioning may be used for positioning between vehicles, and for vehicle safety, highly reliable position information between vehicles needs to be provided, and positioning control information needs to be effectively used in consideration of various factors that affect positioning.

To improve the performance of on-demand sidelink positioning, effective power sharing and power control are required in consideration of the efficiency of V2X data transmission and the overall efficiency of sidelink resource use.

DISCLOSURE

Technical Problem

An object of the present disclosure is to provide a method of sharing power and resources for sidelink positioning and apparatus therefor.

Another object of the present disclosure is to provide a power control method for on-demand sidelink positioning in a new radio vehicle-to-everything (NR-V2X) positioning system and apparatus therefor.

Another object of the present disclosure is to provide a method of performing power allocation and/or power sharing for hybrid automatic repeat request (HARQ) feedback information (HFI) and a positioning reference signal (PRS) based on priorities when the PRS is transmitted on a physical sidelink feedback channel (PSFCH) in an NR-V2X positioning system and apparatus therefor.

Another object of the present disclosure is to provide a method of allocating power for NR-V2X data and sidelink positioning data based on priorities when sidelink positioning data is transmitted on an NR-V2X data transmission resource in an NR-V2X positioning system and apparatus therefor.

Another object of the present disclosure is to provide a PSFCH resource management method for solving a half-duplex problem that may occur when a user equipment (UE) participates in or supports different heterogeneous services on the same PSFCH resource.

Another object of the present disclosure is to provide various methods for solving a half-duplex problem that may occur between transmission and reception of a request PRS (TX-PRS) and a response PRS (RX-PRS) while a UE performs on-demand sidelink positioning.

A further object of the present disclosure is to provide various positioning data dedicated resource pool structures for positioning data transmission, which are different from conventional resources for V2X data transmission, and management methods therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of sharing power by a user equipment (UE) in a new radio vehicle-to-everything (NR-V2X) communication system. The method may include: configuring a resource for transmitting hybrid automatic repeat request acknowledgement (HARQ-ACK) feedback information (HFI) related to NR-V2X services and a resource for transmitting a positioning reference signal (PRS) related to sidelink positioning on a physical sidelink feedback channel (PSFCH); when there is a request for simultaneous transmission of the PRS and the HFI, allocating power based on at least one of a priority related to the PRS and a priority related to the HFI; and transmitting at least one of the PRS and the HFI based on the allocated power.

In an embodiment, the resource for transmitting the PRS may include a resource for transmitting a request PRS and a resource for transmitting a response PRS. When there is a request for simultaneous transmission of the request PRS and the response PRS in a same PSFCH slot, power allocated to the PRS may be allocated for transmission of at least one of the request PRS and the response PRS based on at least one of a priority related to the request PRS and a priority related to the response PRS.

In an embodiment, based on both of the priority related to the request PRS and the priority related to the response PRS being greater than or less than thresholds predefined in relation thereto, same power may be allocated regardless of the priorities, power may be allocated in proportion to the priorities, or power preconfigured for the request PRS and the response PRS may be allocated.

In an embodiment, the method may further include: configuring a positioning dedicated data resource pool; sensing utilization of a V2X data resource pool; and when there is a request for V2X data transmission, determining a resource pool to be used for the V2X data transmission based on the sensed utilization of the V2X data resource pool.

In an embodiment, based on determination of the positioning dedicated data resource pool as the resource pool to be used for the V2X data transmission, a V2X data indicator indicating that data transmitted in the positioning dedicated data resource pool is V2X data may be transmitted in first-stage sidelink control information (SCI) on a physical sidelink control channel (PSCCH) and/or second-stage SCI on a physical sidelink shared channel (PSSCH).

In an embodiment, when there is a request for positioning data transmission during the V2X data transmission in the positioning dedicated data resource pool, a positioning dedicated data resource allocated for the V2X data transmission may be preempted for the positioning data transmission based on a priority of positioning data.

In an embodiment, when there is an available positioning dedicated data resource within a latency budget for the positioning data transmission, the positioning dedicated data resource allocated for the V2X data transmission may not be preempted.

In an embodiment, based on both of the priority related to the PRS and the priority related to the HFI being greater than or less than thresholds predefined in relation thereto, i) same power may be allocated regardless of the priorities, ii) power may be allocated in proportion to the priorities, or iii) power preconfigured for the request PRS and the response PRS may be allocated.

In an embodiment, the resource for transmitting the PRS may be configured on the PSFCH in first-stage SCI on a PSCCH and/or second-stage SCI on a PSSCH.

In another aspect of the present disclosure, there is provided a method of sharing power by a UE in an NR-V2X communication system. The method may include: configuring a resource for transmitting HFI related to NR-V2X services and a resource for transmitting a PRS related to sidelink positioning on a PSFCH; when there is a request for simultaneous transmission of the PRS and the HFI, allocating power available in a PSFCH slot for transmission of at least one of the PRS and the HFI based on at least one of a priority related to the PRS and a priority related to the HFI; and transmitting the at least one of the PRS and the HFI based on the allocated power. When there is a request for simultaneous transmission of a request PRS and a response PRS in a same PSFCH slot after the power is allocated for the PRS transmission, the power allocated for the PRS transmission may be allocated to at least one of the request PRS and the response PRS based on a positioning service signal quality sensed in relation to each of the request PRS and the response PRS.

In a further aspect of the present disclosure, there is provided a UE configured to perform sidelink on-demand positioning in an NR-V2X communication system. The UE may include: a radio frequency (RF) transceiver; and a processor connected to the RF transceiver. The processor may be configured to: configure a resource for transmitting a PRS related to the sidelink positioning on a PSFCH; when there is a request for simultaneous transmission of the PRS and HFI related to NR-V2X services, allocate power available in a PSFCH slot for transmission of at least one of the PRS and the HFI based on at least one of a priority related to the PRS and a priority related to the HFI; and transmit the at least one of the PRS and the HFI based on the allocated power.

In an embodiment, the resource for transmitting the PRS may include a resource for transmitting a request PRS and a resource for transmitting a response PRS. When there is a request for simultaneous transmission of the request PRS and the response PRS in a same PSFCH slot, the processor may be configured to allocate power allocated to the PRS for transmission of at least one of the request PRS and the response PRS based on at least one of a priority related to the request PRS and a priority related to the response PRS.

In an embodiment, based on both of the priority related to the request PRS and the priority related to the response PRS being greater than or less than thresholds predefined in relation thereto, the processor may be configured to allocate same power regardless of the priorities, allocate power in proportion to the priorities, or allocate power preconfigured for the request PRS and the response PRS.

In an embodiment, the processor may be configured to: configure a positioning dedicated data resource pool; sense utilization of a V2X data resource pool; and when there is a request for V2X data transmission, determine a resource pool to be used for the V2X data transmission based on the sensed utilization of the V2X data resource pool.

In an embodiment, based on determination of the positioning dedicated data resource pool as the resource pool to be used for the V2X data transmission, the processor may be configured to transmit a V2X data indicator indicating that data transmitted in the positioning dedicated data resource pool is V2X data in first-stage SCI on a PSCCH and/or second-stage SCI on a PSSCH.

In an embodiment, when there is a request for positioning data transmission during the V2X data transmission in the positioning dedicated data resource pool, the processor may be configured to preempt a positioning dedicated data resource allocated for the V2X data transmission for the positioning data transmission based on a priority of positioning data.

In an embodiment, when there is an available positioning dedicated data resource within a latency budget for the positioning data transmission, the processor may be configured to not to preempt the positioning dedicated data resource allocated for the V2X data transmission.

In an embodiment, based on both of the priority related to the PRS and the priority related to the HFI being greater than or less than thresholds predefined in relation thereto, i) same power may be allocated regardless of the priorities, ii) power may be allocated in proportion to the priorities, or iii) power preconfigured for the request PRS and the response PRS may be allocated.

In an embodiment, the resource for transmitting the PRS may be configured on the PSFCH in first-stage SCI on a PSCCH and/or second-stage SCI on a PSSCH.

Advantageous Effects

According to various embodiments, a power sharing method for sidelink positioning and apparatus therefor may be provided.

According to various embodiments, a power control method for on-demand sidelink positioning in a new radio vehicle-to-everything (NR-V2X) positioning system and apparatus therefor may be provided.

According to various embodiments, when hybrid automatic repeat request acknowledgement (HARQ-ACK) feedback information (HFI) transmission and positioning reference signal (PRS) transmission on a physical sidelink feedback channel (PSFCH) are enabled in a new radio vehicle-to-everything (NR-V2X) positioning system, power allocation and/or power sharing for the HFI transmission and/or PRS transmission may be dynamically performed based on the priorities and/or signal qualities of the corresponding services, thereby preventing positioning performance degradation caused by reduction in the coverage of a transmitting user equipment (UE) and degradation of the reception performance of a receiving UE.

According to various embodiments, when sidelink positioning data is transmitted on NR-V2X data transmission resources in an NR-V2X positioning system, power for NR-V2X data and sidelink positioning data may be dynamically allocated based on priorities, thereby minimizing a decrease in the efficiency of V2X data transmission and a decrease in the overall efficiency of sidelink resource use, which may be caused by management of a resource pool dedicated to positioning data.

According to various embodiments, a PSFCH resource management method for solving a half-duplex problem that may occur when a UE participates in or supports different heterogeneous services on the same PSFCH resource may be provided.

According to various embodiments, various methods for solving a half-duplex problem that may occur between transmission and reception of a request PRS (TX-PRS) and a response PRS (RX-PRS) while a UE performs on-demand sidelink positioning may be provided.

According to various embodiments, various positioning data dedicated resource pool structures for positioning data transmission, which are different from conventional resources for V2X data transmission, and management methods therefor may be provided, thereby improving the V2X data transmission rate and the efficiency of sidelink resource use.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings are provided to provide an understanding of the present disclosure, and are intended to illustrate various embodiments of the present disclosure and, together with the description of the specification, explain the principles of the present disclosure.

FIG. 6 is a diagram illustrating radio protocol architectures for sidelink (SL) communication.

BEST MODE

Figure 1:
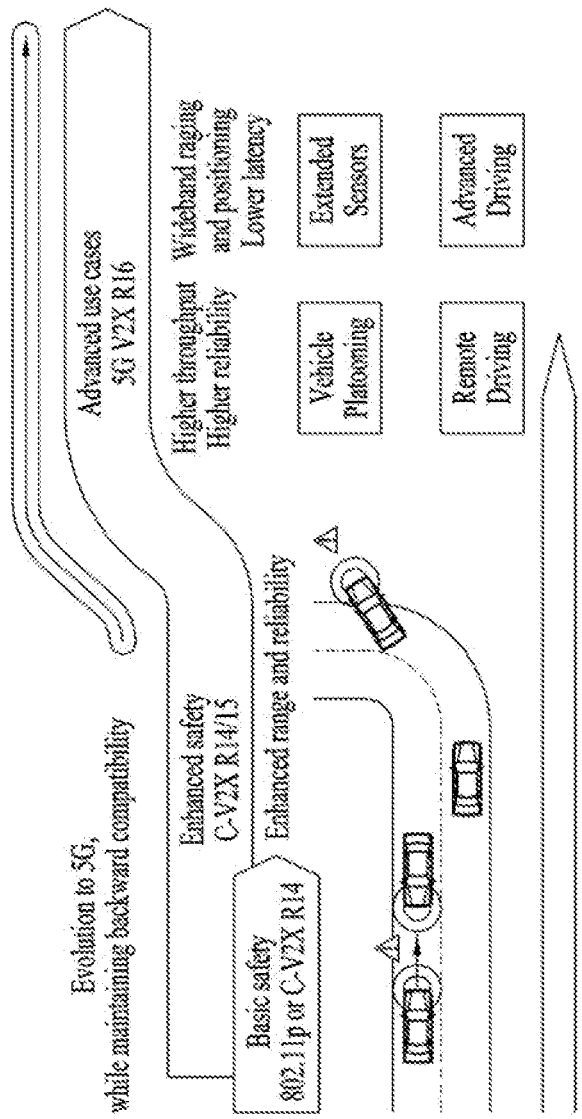
FIG. 1 is a diagram illustrating vehicle-to-everything (V2X) communication based on pre-new radio access technology (NR) RAT and V2X communication based on NR in comparison.

In an aspect of the present disclosure, there is provided a method of sharing power by a user equipment (UE) in a new radio vehicle-to-everything (NR-V2X) communication system. The method may include: configuring a resource for transmitting hybrid automatic repeat request acknowledgement (HARQ-ACK) feedback information (HFI) related to NR-V2X services and a resource for transmitting a positioning reference signal (PRS) related to sidelink positioning on a physical sidelink feedback channel (PSFCH); when there is a request for simultaneous transmission of the PRS and the HFI, allocating power based on at least one of a priority related to the PRS and a priority related to the HFI; and transmitting at least one of the PRS and the HFI based on the allocated power.

Mode

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 2:
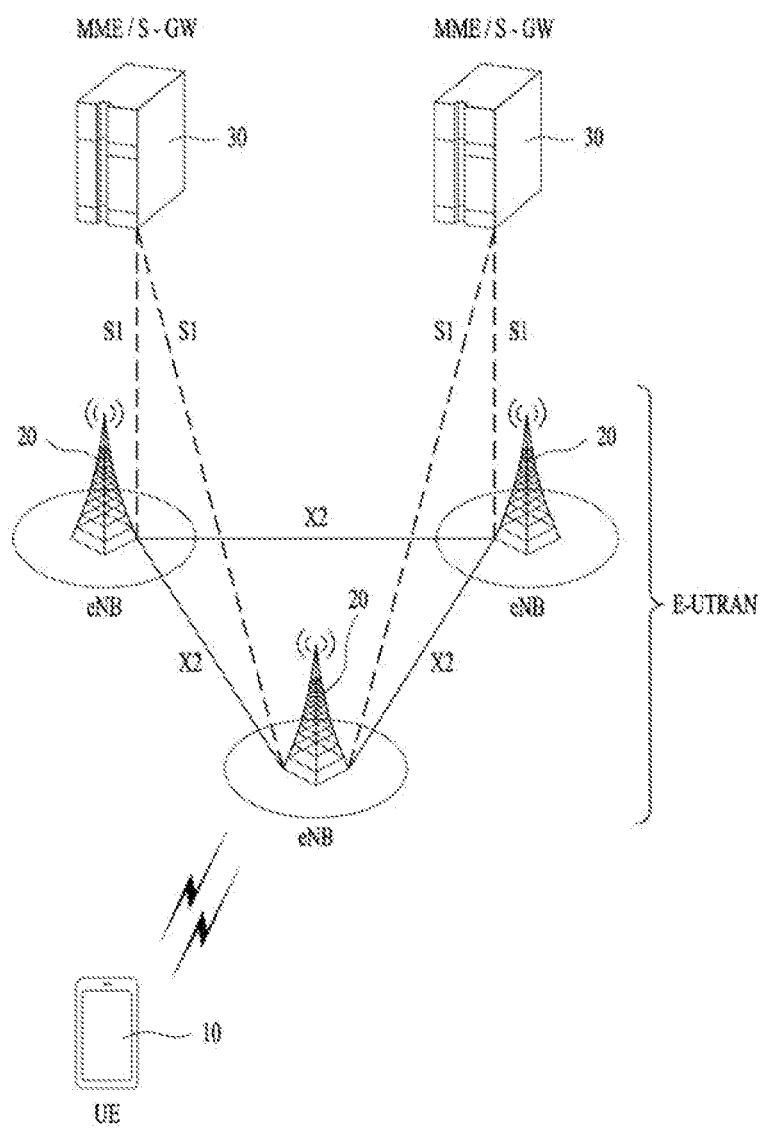
FIG. 2 is a diagram illustrating the structure of a long term evolution (LTE) system.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
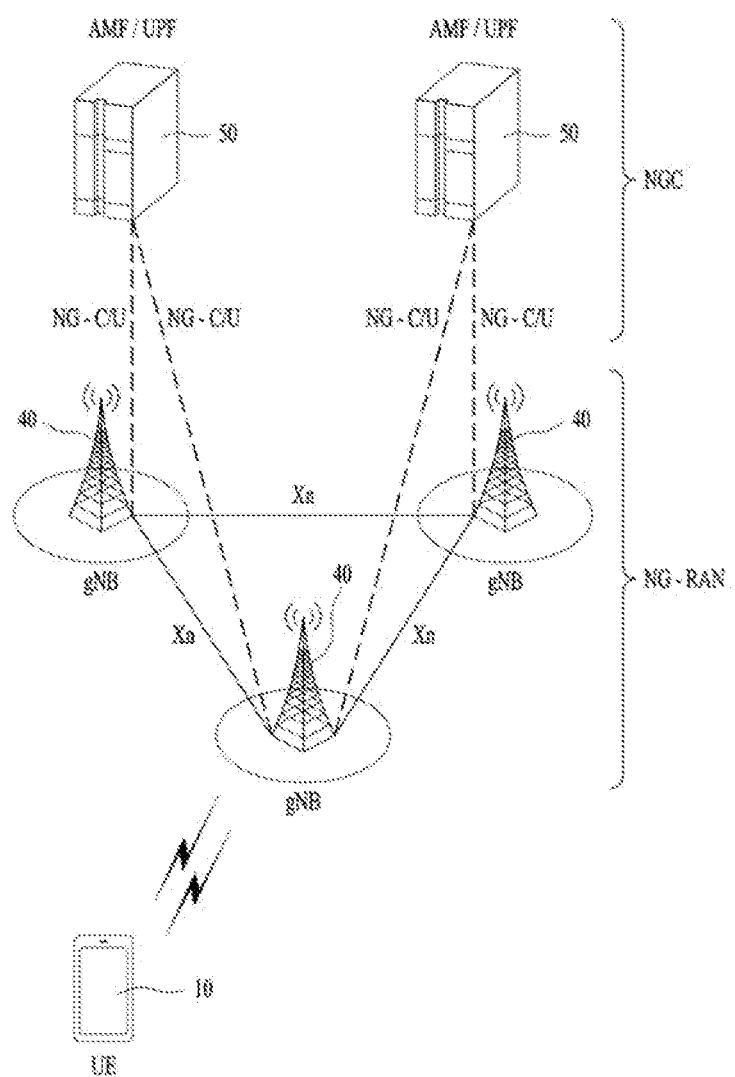
FIG. 3 is a diagram illustrating the structure of an NR system.

FIG. 3 illustrates the structure of an NR system

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
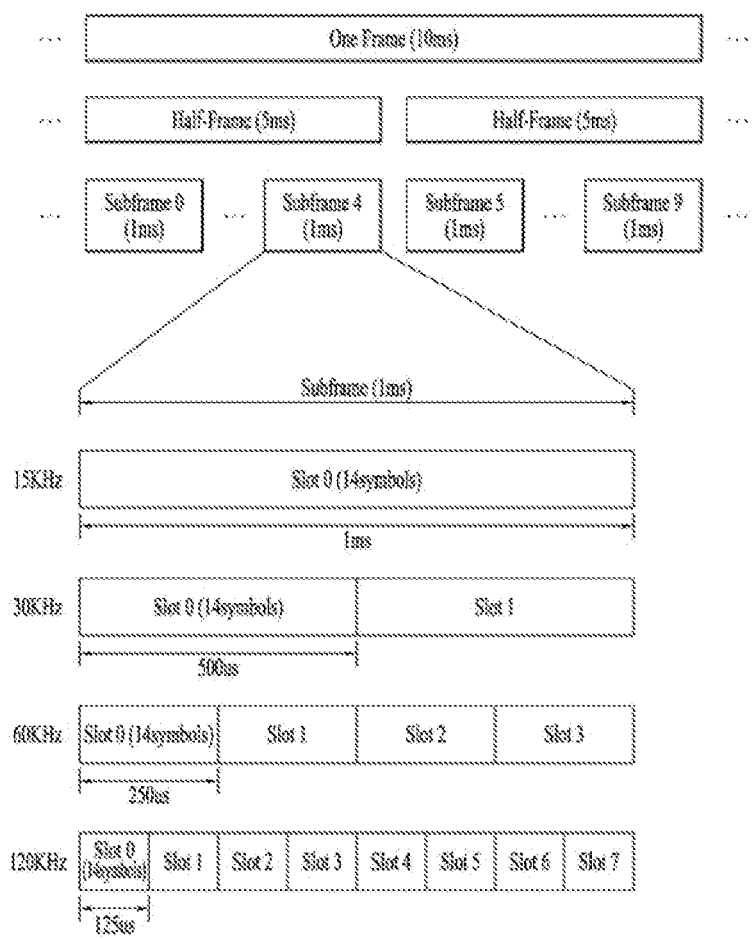
FIG. 4 is a diagram illustrating the structure of an NR radio frame.

FIG. 4 illustrates a radio frame structure in NR.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15 * 2u) | Nslotsymb | Nframe,uslot | Nsubframe,uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * 2u) | Nslotsymb | Nframe,uslot | Nsubframe,uslot |
|---|---|---|---|
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | Nslotsymb | Nframe,uslot | Nsubframe,uslot |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
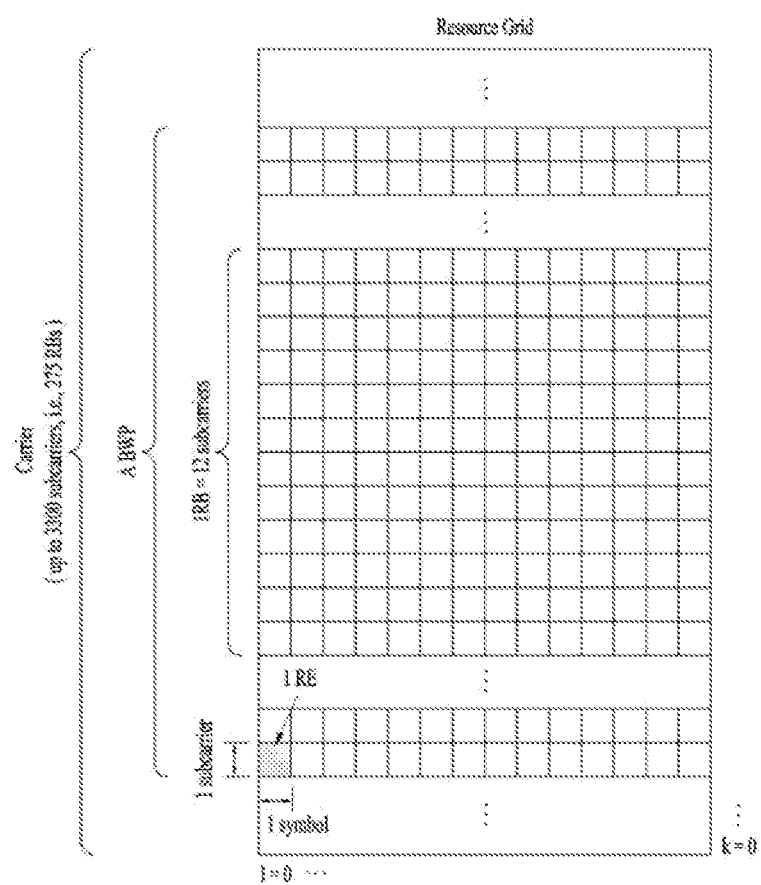
FIG. 5 is a diagram illustrating a slot structure in an NR frame.

FIG. 5 illustrates a slot structure in an NR frame.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

FIG. 6 illustrates a radio protocol architecture for SL communication Specifically, FIG. 6(a) illustrates a user-plane protocol stack in LTE, and FIG. 6(b) illustrates a control-plane protocol stack in LTE.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
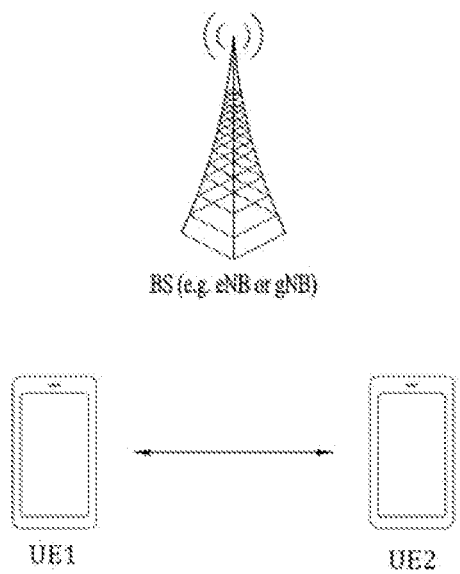
FIG. 7 is a diagram illustrating user equipments (UEs) which conduct V2X or SL communication between them

FIG. 7 illustrates UEs that conduct V2X or SL communication between them

Referring to FIG. 7, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 8:
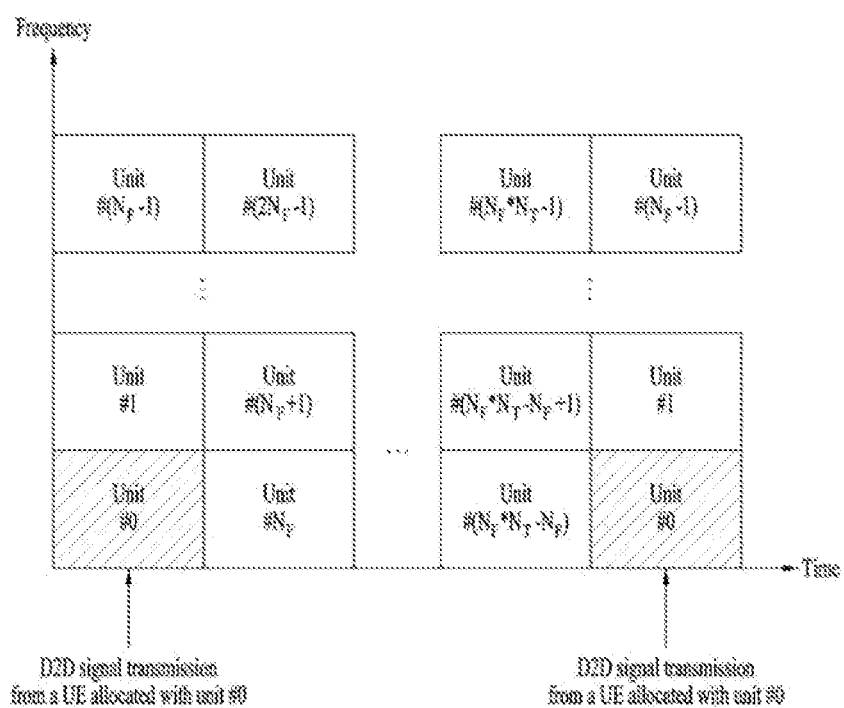
FIG. 8 is diagram illustrating resource units for V2X or SL communication

FIG. 8 illustrates resource units for V2X or SL communication.

Referring to FIG. 8, the total frequency resources of a resource pool may be divided into NF frequency resources, and the total time resources of the resource pool may be divided into NT time resources. Thus, a total of NF*NT resource units may be defined in the resource pool. FIG. 8 illustrates an example in which the resource pool is repeated with a periodicity of NT subframes.

As illustrates in FIG. 8, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 9:
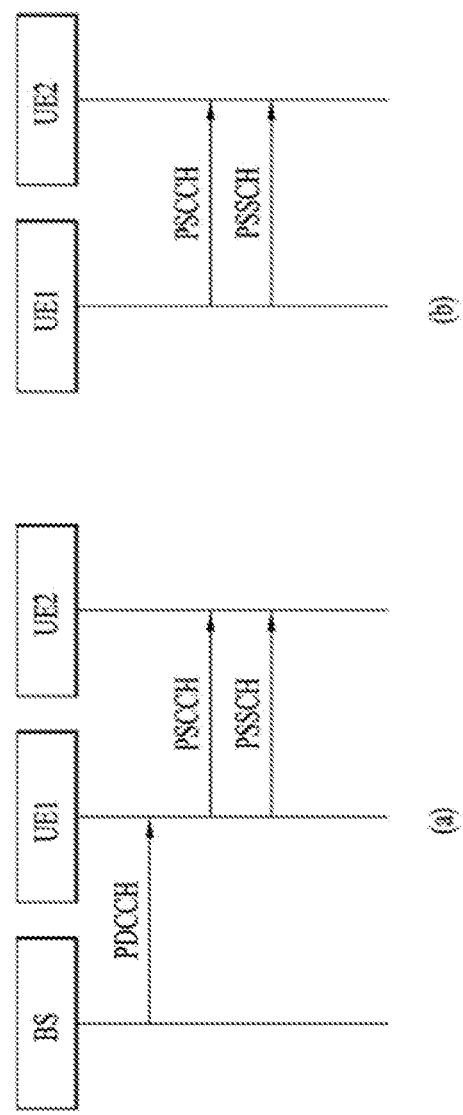
FIG. 9 is a diagram illustrating signal flows for V2X or SL communication procedures of a UE according to transmission modes

FIG. 9 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 9 (*a*) illustrates a UE operation related to LTE transmission mode 1 or LTE transmission mode 3. Alternatively, for example, FIG. 9 (*a*) illustrates a UE operation related to NR resource allocation mode 1. For example, LTE transmission mode 1 may be applied to general SL communication, and LTE transmission mode 3 may be applied to V2X communication.

For example, FIG. 9 (*b*) illustrates a UE operation related to LTE transmission mode 2 or LTE transmission mode 4. Alternatively, for example, FIG. 9 (*b*) illustrates a UE operation related to NR resource allocation mode 2.

Referring to FIG. 9 (*a*), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 9 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in physical layer, and a master information block-sidelink-V2X (MIB-SL-V2X) may be used in a radio link control (RLC) layer.

Tx/Rx Beam Sweep

When a very high frequency is used as in mmWave, beamforming may be generally used to overcome high pathloss. In order to use beamforming, first, the best beam pair needs to be detected among several beam pairs between a transmitting end and a receiving end. This process may be referred to as beam acquisition or beam tracking or beam tracking in terms of the receiving end. In particular, in mmWave, analog beamforming is used, and thus a vehicle needs to perform beam sweeping for switching beams in different directions at different times using an antenna array of the vehicle itself during the beam acquisition or the beam tracking.

Multiple Active Sidelink BWPs

In NR V2X, communication through support of a plurality of BWPs (i.e., support of a plurality of configured sidelink BWPs and/or support of a plurality of active sidelink BWPs) may be considered. This may be for supporting different numerologies or heterogeneous services/communications that require parameters and/or requirements or may also be for ICI reduction due to a reduced CP length.

Figure 10:
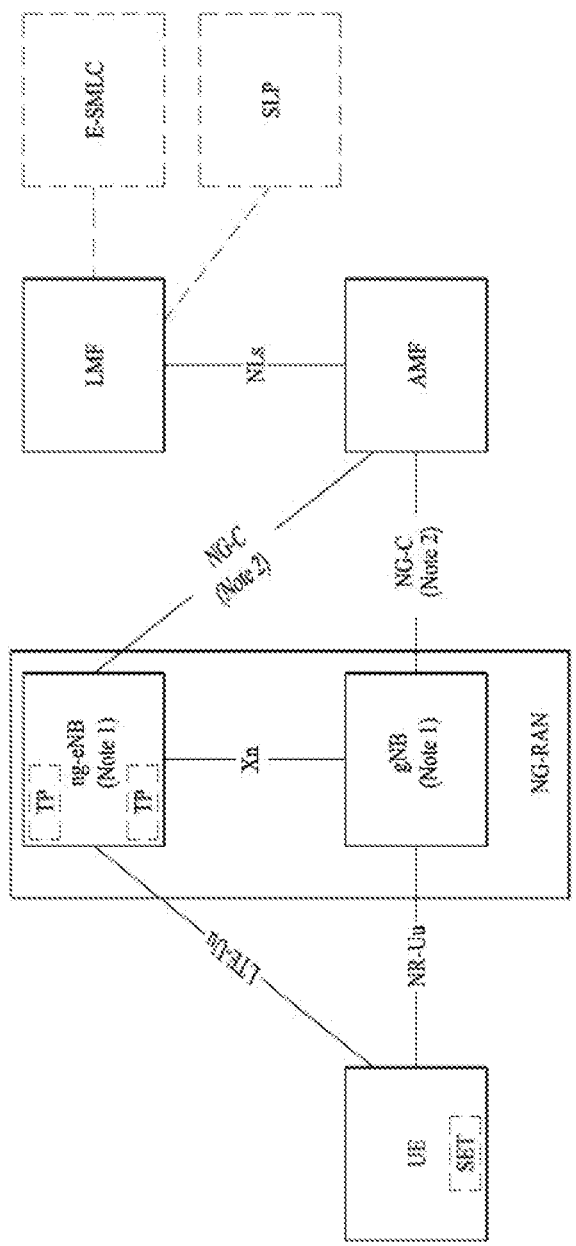
FIG. 10 illustrates an exemplary architecture of a 5G system capable of positioning a UE connected to an NG-RAN or an E-UTRAN according to an embodiment of the present disclosure.

FIG. 10 illustrates an exemplary architecture of a 5G system capable of positioning a UE connected to an NG-RAN or an E-UTRAN according to an embodiment of the present disclosure.

Referring to FIG. 10, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDoA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 11:
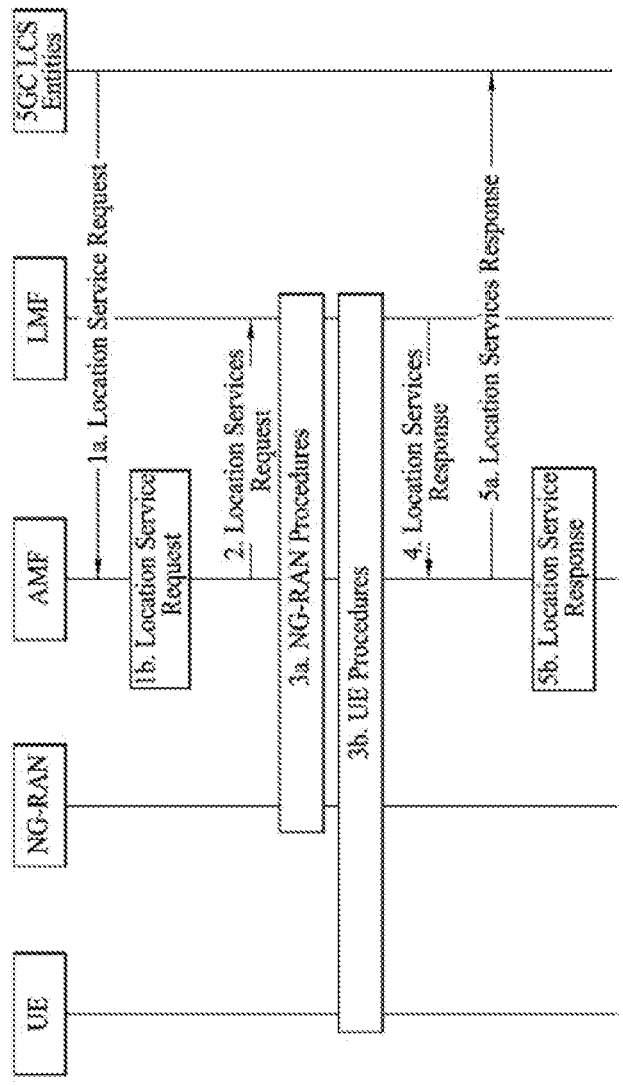
FIG. 11 illustrates exemplary implementation of a network for positioning a UE according to an embodiment of the present disclosure.

FIG. 11 illustrates exemplary implementation of a network for positioning a UE according to an embodiment of the present disclosure.

Upon receipt of a location service request when the UE is in a connection management—IDLE (CM-IDLE) state, the AMF may establish a signaling connection with the UE and request a network trigger service to assign a specific serving gNB or ng-eNB. This operation is not shown in FIG. 11. That is, FIG. 11 may be based on the assumption that the UE is in connected mode. However, the signaling connection may be released by the NG-RAN due to signaling and data deactivation during positioning.

Referring to FIG. 11, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 11 is initiated in step 1a, the AMF may deliver the location service response to the 5GC entity such as the GMLC. When the procedure of FIG. 11 is initiated in step 1b, the AMF may use the location service response to provide the location service related to an emergency call or the like.

Hereinafter, a Hybrid Automatic Repeat Request (HARQ) procedure in a sidelink will be described.

An error compensation scheme for ensuring communication reliability may include a Forward Error Correction (FEC) scheme and an Automatic Repeat Request (ARQ) scheme. In the FEC scheme, error at a reception end may be corrected by adding an extra error correction code to information bits. The FEC scheme is advantageous in that time delay is low and information that is separately transmitted and received between transmission and reception ends is not required, but is disadvantageous in that system efficiency is degraded in a fine channel environment. The ARQ scheme has high transmission reliability, but is disadvantageous in that time delay occurs and system efficiency is degraded in a poor channel environment.

The Hybrid Automatic Repeat Request (HARQ) scheme is obtained by combining the FEC and the ARQ, and in this case, performance may be improving performance by checking whether data received by a physical layer contains error that is not capable of being decoded and requesting retransmission when error occurs.

In the case of SL unicast and groupcast, HARQ feedback and HARQ combining at a physical layer may be supported. For example, when a reception UE operates in a resource allocation mode 1 or 2, the reception UE may receive a PSSCH from a transmission UE, and the reception UE may transmit HARQ feedback with respect to the PSSCH to the transmission UE using a Sidelink Feedback Control Information (SFCI) format through a physical sidelink feedback channel (PSFCH).

For example, the SL HARQ feedback may be enabled for unicast. In this case, in a non-Code Block Group (non-CBG) operation, the reception UE may decode the PSCCH with the reception UE as a target, and when the reception UE successfully decodes a transmission block related to the PSCCH, the reception UE may generate a HARQ-ACK. The reception UE may transmit the HARQ-ACK to the transmission UE. In contrast, when the reception UE decodes the PSCCH with the reception UE as a target and then does not successfully decode the transmission block related to the PSCCH, the reception UE may generate the HARQ-NACK. The reception UE may transmit the HARQ-NACK to the transmission UE.

When sidelink HARQ feedback is enabled for groupcast, the UE may determine whether to transmit HARQ feedback based on a TX-RX distance and/or RSRP. In the case of a non-CBG operation, two options may be supported.

(1) Option 1: When a reception UE fails to decode a corresponding transport block after decoding a PSCCH associated to the reception UE, the reception UE may transmit HARQ-NACK on a PSFCH. Otherwise, the reception UE may not transmit a signal on the PSFCH.

(2) Option 2: When the reception UE successfully decodes the transport block, the reception UE may transmit HARQ-ACK on the PSFCH. After the reception UE decodes an associated PSCCH using the reception UE as a target, if the reception UE does not successfully decode the corresponding transport block, the reception UE may transmit HARQ-NACK on the PSFCH.

In the case of mode 1 resource allocation, a time between HARQ feedback transmission on the PSFCH and the PSSCH may be (pre)configured. In the case of unicast and groupcast, when retransmission on sidelink is required, this may be indicated to an eNB by a UE within coverage using the PUCCH. The transmission UE may also transmit indication to a serving eNB of the transmission UE in the form of scheduling request (SR)/buffer status report (BSR) but not the form of HARQ ACK/NACK. Even if the eNB does not receive the indication, the eNB may schedule a sidelink retransmission resource to the UE.

In the case of mode 2 resource allocation, a time between HARQ feedback transmission on the PSFCH and the PSSCH may be (pre)configured.

Embodiment 1

The present embodiment relates to a technology of transmitting a positioning reference signal (PRS) for sidelink positioning through a physical sidelink feedback channel (PSFCH) in an NR-V2X system and proposes a PRS transmission method using a PRS transmission structure preconfigured on the PSFCH and the PSFCH in order to effectively use a PSFCH-PRS resource (a PSFCH resource for PRS).

For pre-configuration of the PSFCH-PRS, on-demand positioning may be considered, and 1) a transmission structure between a request PRS and a response PRS, 2) a time gap between a request PRS transmission time and a response PRS reception time (request PRS-response PRS time gap), 3) PRS ID allocation for request PRS and response PRS transmission, and the like may be mainly considered.

When sidelink on-demand positioning is performed, PSFCH-PRS resources for efficient use of sidelink transmission resources may be preconfigured.

Hereinafter, power sharing (or power control) methods for solving power distribution problems that may occur when a UE uses the same PSFCH resource to participate in or support different heterogeneous services will be described in detail.

In particular, in the present embodiment, there are proposed methods for solving various power sharing problems that may occur when a PSFCH resource is used for HARQ-ACK feedback information (HFI) transmission for NR-V2X services and PRS transmission for sidelink positioning services.

The following terms are used to explain the methods according to the present embodiment.

Data may include message information, voice/image information, sensor information, position information, and the like.

The sidelink positioning may include on-demand positioning and broadcast positioning.

On-demand positioning may include absolute positioning and relative positioning.

An upper (higher) layer may include an application layer and a facility layer.

In sidelink on-demand positioning, a PRS may include a request PRS (TX-PRS or PRS request) and a response PRS (RX-PRS or PRS response). In this case, the response PRS means a PRS transmitted by a UE that receives the request PRS in response to the request PRS.

A PSFCH-HARQ resource (or PSFCH resource (used) for HARQ feedback) indicates a resource allocated for HFI transmission among all available resources on a PSFCH.

A PSFCH-PRS resource (or PSFCH resource (used) for PRS) means a resource allocated for PRS transmission among all available resources on a PSFCH. In an embodiment, if a PRS and HFI are simultaneously transmitted on the same PSFCH, PSFCH-PRS resources may be the remaining resources except for PSFCH-feedback resources for HFI transmission.

A positioning UE may mean a UE that transmits a request PRS to perform positioning, and a neighbor UE may mean a UE that participates in positioning and transmits a response PRS.

When the UE is requested to perform or participate in positioning by higher layers, the UE may transmit a request PRS and/or a response PRS.

The positioning service priority may vary depending on the location based service (LBS) that the UE intends to perform, which may be provided in first-stage SCI/first SCI on a physical sidelink control channel (PSCCH) and/or second stage SCI/second SCI on a physical sidelink shared channel (PSSCH).

In the description of the following embodiments, a larger threshold related to a specific service priority may mean a lower threshold level, and a smaller threshold may mean a higher threshold level. That is, when the priority of a service is greater than a specific threshold, it may mean that the priority of the corresponding service is lower than a specific threshold level. On the other hand, when the priority of a service is smaller than a specific threshold, it may mean that the priority of the corresponding service is higher than a specific threshold level.

Hereinafter, a description will be given of various methods for solving power sharing problems that may occur when PSFCH resources composed of PSFCH-HARQ resources and PSFCH-PRS resources (or including PSFCH-HARQ resources and PSFCH-PRS resources) are used for transmission of HFI related to NR-V2X services and transmission of a PRS (request PRS and/or response PRS) related to sidelink positioning services. Here, the power sharing problem that may be observed when the UE participates in or support NR-V2X services and sidelink positioning services may refer to HFI transmission power loss or PRS transmission power loss that may occur when the UE intends to simultaneously perform HFI transmission and PRS transmission on a PSFCH-HARQ resource and a PSFCH-PRS resource at the same time/time point, for example, the same logical slot, subframe, or symbol. The transmission power loss may cause reception performance degradation such as a decrease in the coverage of a transmitting UE and a decrease in the signal-to-noise ratio (SNR) of a receiving UE. Therefore, the present embodiment proposes various methods for effectively solving the power sharing problem. In the description below, the use of the same PSFCH resource may mean that the UE uses a PSFCH resource composed of a PSFCH-HARQ resource and a PSFCH-PRS resource placed at the same time/time point.

Power sharing problems may occur when the UE attempts to simultaneously perform HFI transmission and PRS (request PRS and/or response PRS) transmission on the same PSFCH resource, and these power sharing problems may be effectively solved based on the NR-V2X service or proximity service (ProSE) per packet priority (PPPP) related to the HFI transmission and the positioning priority per service (PPPS) related to the PRS transmission.

In an embodiment, when the NR-V2X service priority related to HFI transmission is higher than a predefined priority threshold (i.e., (pre-)configured PPPP threshold) level, the power for HFI transmission may be allocated in proportion to the corresponding priority. On the other hand, when the NR-V2X service priority is lower than or equal to the predefined priority threshold level, the power for HFI transmission may be reduced (in proportion to the corresponding priority or by a preset level) or may not be allocated. In addition, if the positioning service priority related to PRS transmission is higher than a predefined priority threshold (i.e., (pre-)configured PPPS threshold) level, the power for PRS transmission may be allocated in proportion to the corresponding priority. On the other hand, if the positioning service priority is lower than or equal to the predefined priority threshold level, the power for PRS transmission may be reduced (in proportion to the corresponding priority or by a preset level) or may not be allocated. In this case, the (pre-)configured PPPS threshold and the (pre-)configured PPPP threshold may be predefined or determined by the location server/LMF and/or BS and then transmitted to the UE.

Hereinafter, HFI and/or PRS transmission methods based on various power sharing methods will be described.

Method-1: It may be predefined that power sharing is not allowed between HFI transmission and PRS transmission and power is allocated only to the HFI transmission. That is, the NR-V2X service priority threshold level related to HFI transmission may be set to the lowest (or the NR-V2X service priority related to HFI transmission may be set to the lowest), but the positioning service priority threshold level related to PRS transmission may be set to the highest (or the positioning service priority related to PRS transmission may be set to the highest). By doing so, all power may be allocated only to the HFI transmission, and no power may be allocated for the PRS transmission so that the PRS transmission may be dropped.

Method-2: It may be predefined that power sharing is not allowed between HFI transmission and PRS transmission and power is allocated only to the PRS transmission. That is, the NR-V2X service priority threshold related to HFI transmission may be set to the highest (or the NR-V2X service priority related to HFI transmission may be set to the lowest), but the positioning service priority threshold level related to PRS transmission may be set to the lowest (or the positioning service priority related to PRS transmission may be set to the lowest). By doing so, all power may be allocated only to the PRS transmission, and the HFI transmission may be controlled to be dropped.

Hereinafter, a description will be given of a case in which, in the PRS transmission of Method-2, HFI is transmitted to support an NR-V2X service lower than the NR-V2X service priority threshold even though the positioning service priority is higher than the predefined priority threshold. That is, as an embodiment of such an exception operation, it may be considered that the operation priority between HFI transmission and request PRS transmission takes precedence over the power sharing method, that is, a rule disallowing power sharing between HFI transmission and PRS transmission. In the following, power sharing methods for HFI transmission and request PRS transmission in the above case will be described in detail.

As the exception operation in Method-2, in an embodiment, if HFI transmission takes precedence over request PRS transmission, all power may be allocated only to the HFI transmission and the request PRS transmission may be dropped. In another embodiment, if HFI transmission takes precedence over request PRS transmission, the power value (amount) for HFI transmission and the power value (amount) for request PRS transmission may be calculated, distributed, and/or configured in advance and then applied.

As the exception operation in Method-2, if HFI transmission takes precedence over response PRS transmission, the HFI transmission and response PRS transmission may be performed similarly to the case where HFI transmission takes precedence over to request PRS transmission.

Method-3: For simultaneous transmission of HFI and a PRS, the total power (or available power on a corresponding PSFCH) may be shared or distributed. That is, when the NR-V2X service priority related to HFI transmission is higher than the predefined priority threshold and the positioning service priority related to PRS transmission is higher than the predefined priority threshold, power sharing between the HFI transmission and PRS transmission may be performed as follows: 1) the total power may be distributed in proportion to the NR-V2X service priority related to HFI transmission and the positioning service priority related to PRS transmission; 2) the total power may be equally distributed; or 3) the power for HFI transmission and the power for request PRS (or response PRS) transmission may be calculated, distributed and configured in advance and then applied.

Hereinafter, a description will be given of a case in which, in the PRS transmission of Method-3, HFI is transmitted to support NR-V2X services even though the positioning service priority is higher than the predefined priority threshold level. That is, as an embodiment of such an exception operation, it may be considered that the operation priority between HFI transmission and request PRS transmission takes precedence over the power sharing method. In the following, power sharing methods for HFI transmission and request PRS transmission in the above case will be described in detail.

As the exception operation in Method-3, in an embodiment, if HFI transmission takes precedence over request PRS transmission, all power may be allocated only to the HFI transmission and the request PRS transmission may be dropped. As another embodiment, if HFI transmission takes precedence over request PRS transmission, the power value (amount) for HFI transmission and the power value (amount) for request PRS transmission may be calculated, distributed, and/or configured in advance and then applied.

As the exception operation in Method-3, if HFI transmission takes precedence over response PRS transmission, the HFI transmission and response PRS transmission may be performed similarly to the case where HFI transmission takes precedence over to request PRS transmission.

Method-4: Even when the NR-V2X service priority related to HFI transmission is lower than or equal to the predefined priority threshold level or the positioning service priority related to PRS transmission is lower than or equal to the predefined priority threshold level, the total power (or available power on a corresponding PSFCH resource) may be shared or distributed between the HFI transmission and PRS transmission, similarly to Method-3. That is, power sharing between HFI transmission and PRS transmission may be performed as follows: 1) the total power may be distributed in proportion to the NR-V2X service priority related to HFI transmission and the positioning service priority related to PRS transmission; 2) the total power may be equally distributed; or 3) the power value (amount) for HFI transmission and the power value (amount) for request PRS transmission may be calculated, distributed and configured in advance and then applied.

Hereinafter, a description will be given of methods for effectively solving power sharing problems, which may occur when the UE attempts to simultaneously perform HFI transmission and PRS (request PRS and/or response PRS) transmission on the same PSFCH resource, based on the NR-V2X service priority related to the HFI transmission. In an embodiment, proposed is a power sharing method between HFI transmission and PRS transmission in consideration of only the NR-V2X service priority, that is, without consideration of the positioning service priority. The power sharing method between HFI transmission and PRS transmission in consideration of only the NR-V2X service priority may ensure backward compatibility with a conventional power sharing method between HFI transmission and uplink (UL) transmission. In the following, various power sharing methods proposed for HFI transmission and PRS transmission will be described.

If the NR-V2X service priority related to HFI transmission is lower than the predefined priority threshold level when power is shared between HFI transmission and UL transmission, the UE may drop the HFI transmission or reduce the power for HFI transmission. In this case, power sharing for PRS transmission may be performed as follows.

If no HFI is transmitted, no PRS may be transmitted. That is, when the power for HFI transmission is not allocated, the power for PRS transmission may also not be allocated.

If the HFI transmission power is reduced, the PRS transmission power may also be reduced proportionally.

If the HFI transmission power is reduced, the PRS transmission power may not be allocated.

If the HFI transmission power is reduced, the UE may determine whether to perform power sharing between the HFI transmission and PRS transmission. Then, depending on the determination results, the UE may reduce the PRS transmission power or may not allocate the PRS transmission power. Hereinafter, a description will be given of a method by which the UE determines whether to share power between HFI transmission and PRS transmission and a method by which the UE share the power according to the determination results.

In an embodiment, whether power sharing is performed between HFI transmission and PRS transmission may be determined according to the NR-V2X service priority related to the HFI transmission. That is, if the NR-V2X service priority related to the HFI transmission is smaller than the predefined NR-V2X service priority threshold, the UE may allocate zero power to the PRS transmission for highly reliable HFI transmission upon determining whether to perform the power sharing between the HFI transmission and PRS transmission. On the other hand, if the NR-V2X service priority related to the HFI transmission is greater than or equal to the predefined NR-V2X service priority threshold, the UE may perform the power sharing between the HFI transmission and PRS transmission. In this case, the power for PRS transmission may be allocated as follows.

The power for HFI transmission and the power for PRS transmission may be calculated, distributed and configured in advance according to the NR-V2X service priority related to the HFI transmission. In this case, the power for HFI transmission may be distributed greater than or equal to the power for PRS transmission.

The ratio between the power for HFI transmission and the power for PRS transmission may be calculated, distributed, and/or configured in advance according to the NR-V2X service priority related to the HFI transmission. In this case, the ratio may be determined such that the power for HFI transmission is greater than or equal to the power for PRS transmission.

The power for HFI transmission and the power for PRS transmission may be equally shared.

In another embodiment, the UE may determine whether to perform power sharing between HFI transmission and PRS transmission based on the RSSI or RSRP value measured when receiving NR-V2X service packets (data or signals) related to the HFI transmission. That is, if the RSSI or RSRP value measured upon reception of the NR-V2X service related to the HFI transmission is lower than or equal to a specific threshold, the UE may allocate only power for HFI transmission without allocation of power for PRS transmission for highly reliable HFI transmission. On the other hand, if the RSSI or RSRP value measured upon the reception of the NR-V2X service related to the HFI transmission is higher than the specific threshold, the UE may determine that the power for HFI transmission is sufficient and then perform the power sharing. In this case, the power for PRS transmission may be allocated as follows.

The power for HFI transmission and the power for PRS transmission may be calculated, distributed, and configured in advance according to the measured RSSI or RSRP value.

The ratio between the power for HFI transmission and the power for PRS transmission may be calculated, distributed, and/or configured in advance according to the measured RSSI or RSRP value.

The power for HFI transmission and the power for PRS transmission may be equally shared.

If the NR-V2X service priority threshold level related to HFI transmission is set to the highest level, the UE may preferentially calculate the power required for UL transmission in performing power sharing between the HFI transmission and UL transmission. Then, the UE may transmit HFI by allocating the residual power to the HFI transmission. In this case, power distribution for PRS transmission may be performed similarly to the above-described power sharing method for HFI transmission and PRS transmission.

Embodiment 2

The present embodiment relates to a PSFCH resource management method for solving a half-duplex problem that may occur when the UE uses the same PSFCH resource to participate in or support different heterogeneous services in the NR-V2X system.

In particular, the present disclosure relates to various methods for solving half-duplex problems that may occur when PSFCH resources are used for HFI transmission for NR-V2X services and PRS transmission for sidelink positioning services and various methods for solving half-duplex problems that may occur between transmission and reception of a request PRS (or TX-PRS) and a response PRS (or RX-PRS) while the UE performs on-demand sidelink positioning in the NR-V2X system.

The present disclosure proposes methods for solving various half-duplex problems that may occur when PSFCH resources composed of PSFCH-HARQ resources and PSFCH-PRS resources (or including PSFCH-HARQ resources and PSFCH-PRS resources) are used for HFI transmission related to NR-V2X services and PRS transmission related to sidelink positioning services. Here, the half-duplex problem that may be observed when the UE participates in or support NR-V2X services and sidelink positioning services may refer to HFI loss or PRS loss that may occur when the UE intends to simultaneously perform HFI reception and PRS transmission on a PSFCH-HARQ resource and a PSFCH-PRS resource allocated at the same time/time point or when the UE intend to simultaneously perform HFI transmission and PRS reception. In the following, various methods of effectively solving the half-duplex problem are proposed. In the description below, the use of the same PSFCH resource may mean the use of a PSFCH resource composed of a PSFCH-HARQ resource and a PSFCH-PRS resource placed at the same time/time point, for example, in the same slot.

First, a description will be given of methods for effectively solving half-duplex problems that may occur in the following cases: 1) when the UE attempts to simultaneously perform request PRS transmission and HFI reception on the same PSFCH resource; and 2) when the UE attempts to simultaneously perform response PRS transmission and HFI reception on the same PSFCH resource.

1) Method of solving half-duplex problem that may occur when request PRS transmission and HFI reception are performed simultaneously Method-1: It may be predefined that HFI reception always has a higher operation priority than request PRS transmission so that the HFI reception is always performed first. That is, to prevent a HFI reception failure (half-duplex problem) that occurs when a HFI transmitting UE (UE transmitting HFI) transmits HFI without knowing in advance a positioning service to be performed by a HFI receiving UE (UE receiving HFI), and at the same time, the HFI receiving UE transmits a request PRS without receiving the HFI, it may be defined that the HFI receiving UE always performs HFI reception first.

Method-2: It may be predefined that request PRS transmission always has a higher operation priority than HFI reception so that the request PRS transmission is always performed first. In this case, in order for the UE to receive HFI on another PSFCH resource generated later, it is necessary to predefine an operation in which the HFI transmitting UE repeatedly transmits the HFI at least two times. For example, when an NR-V2X service and a sidelink positioning service are supported on a PSFCH resource, the HFI transmitting UE may repeatedly transmit the HFI at least two or three times.

Method-3: The operation priority between HFI reception and request PRS transmission may be dynamically determined according to the NR-V2X service or packet priority (PPPP) related to the HFI reception and the positioning service priority (PPPS) related to the request PRS transmission. In the following, embodiments according to Method-3 will be described.

As an example, when the positioning service priority related to request PRS transmission is higher than a priority threshold ((pre-)configured PPPS threshold) level predefined in relation to positioning services, and when the NR-V2X service priority related to HFI reception is lower than a second priority threshold ((pre-)configured PPPP threshold) level predefined in relation to NR-V2X services, the UE may determine that positioning service support is more important and perform the request PRS transmission first. The UE may receive HFI on another PSFCH resource that is generated later. In this case, the (pre-)configured PPPS threshold and the (pre-)configured PPPP threshold may be predefined, or the (pre-)configured PPPS threshold and the (pre-)configured PPPP threshold may be determined by the location server/LMF and/or BS.

As another example, when the HFI transmitting UE is capable of obtaining information on the priority of a positioning service, which is performed by the HFI receiving UE, the HFI transmitting UE may adjust the HFI transmission time based on the obtained information on the priority of the positioning service.

As another example, when the NR-V2X service priority related to HFI reception is higher than the predefined priority threshold level, the UE may first perform the HFI reception regardless of the positioning service priority related to request PRS transmission and then transmit a request PRS on another PSFCH resource that is generated later.

As a further example, when the NR-V2X service priority related to HFI reception is lower than the predefined priority threshold level, and when the positioning service priority related to request PRS transmission is lower than the predefined priority threshold level, the operation order may be determined according to the UE implementation (or service policy).

2) Method of solving half-duplex problem that may occur when response PRS transmission and HFI reception are simultaneously attempted Method-1: It may be predefined that HFI reception always has a higher operation priority than response PRS transmission so that the HFI reception is always performed first. For example, to prevent a HFI reception failure in advance, which occurs when the HFI transmitting UE transmits HFI without knowing in advance a positioning service to be performed by the HFI receiving UE, and at the same time, the HFI receiving UE transmits a response PRS without receiving the HFI, it may be defined that the HFI receiving UE always performs HFI reception first.

Method-2: It may be predefined that response PRS transmission has a higher operation priority than HFI reception so that the response PRS transmission is always performed first. For example, when the UE moves at a high speed, response PRS transmission needs to be performed immediately after request PRS transmission in order to improve positioning accuracy. In this case, in order for the UE to receive HFI on another PSFCH resource generated later, it is necessary to predefine an operation in which the HFI transmitting UE repeatedly transmits the HFI at least two times. For example, when an NR-V2X service and a sidelink positioning service are supported on a PSFCH resource, the HFI transmitting UE may repeatedly transmit the HFI at least two or three times.

Method-3: The operation priority between HFI reception and response PRS transmission may be dynamically determined according to the NR-V2X service priority and the positioning service priority. In the following, relevant embodiments will be described.

As an example, when the positioning service priority related to response PRS transmission is higher than the priority threshold level predefined in relation to positioning services, and when the NR-V2X service priority related to HFI reception is lower than the predefined priority threshold level in relation to NR-V2X services, the UE may perform the response PRS transmission first and then receive HFI on another PSFCH resources generated later. In this case, if the HFI transmitting UE is capable of obtain information on the priority of a positioning service performed by the HFI receiving UE in advance, the HFI transmitting UE may adjust the HFI transmission time.

As another example, when the NR-V2X service priority related to HFI reception is higher than the predefined priority threshold level in relation to NR-V2X services, the UE may perform the HFI reception first, regardless of the positioning service priority related to response PRS transmission. Then, the UE may transmit a response PRS on another PSFCH resource that is generated later.

As a further example, when the NR-V2X service priority related to HFI reception is lower than the predefined priority threshold level in relation to NR-V2X services, and when the positioning service priority related to response PRS transmission is lower than the predefined priority threshold level in relation to positioning services, the operation order may be determined according to the UE implementation (or service policy).

Hereinafter, a description will be given of methods for effectively solving half-duplex problems that may occur in the following cases: 3) when the UE attempts to simultaneously perform HFI transmission and response PRS reception on the same PSFCH resource; and 4) when the UE attempts to simultaneously perform HFI transmission and request PRS reception on the same PSFCH resource.

3) Method of solving half-duplex problem that may occur when HFI transmission and response PRS reception are simultaneously attempted Method-1: It may be predefined that response PRS reception always has a higher operation priority than HFI transmission so that the response PRS reception is always performed first. For example, when the UE moves at a high speed, response PRS reception needs to be performed immediately after request PRS transmission in order to improve positioning accuracy. That is, to prevent a failure in response PRS reception in advance, which occurs when a response PRS transmitting UE (UE transmitting a response PRS) transmits a response PRS without knowing in advance an NR-V2X service to be performed by a response PRS receiving UE (UE receiving a response PRS), and at the same time, the response PRS receiving UE transmits HFI without receiving the response PRS, it may be defined that the response PRS receiving UE always performs response PRS reception first.

Method-2: It may be predefined that HFI transmission always has a higher operation priority than response PRS reception so that the HFI transmission is always performed first. In this case, in order for the UE to receive a response PRS on another PSFCH resource generated later, it is necessary to predefine an operation in which the response PRS transmitting UE repeatedly transmits the response PRS at least two times. For example, when an NR-V2X service and a sidelink positioning service are supported on a PSFCH resource, the response PRS transmitting UE may repeatedly transmit the response PRS at least two or three times.

Method-3: The operation priority between HFI transmission and response PRS reception may be dynamically determined according to the NR-V2X service priority and the positioning service priority.

As an example, when the NR-V2X service priority related to HFI transmission is higher than the predefined priority threshold level in relation to NR-V2X services, the HFI transmission may be performed first, regardless of the positioning service priority related to response PRS reception, and then the response PRS reception may be performed on another PSFCH resource generated later. If the response PRS transmitting UE is capable of obtaining information on the priority of an NR-V2X service to be performed by the response PRS receiving UE, the response PRS transmitting UE may adjust the response PRS transmission time.

As another example, when the positioning service priority related to response PRS reception is higher than the predefined priority threshold level in relation to positioning services, and when the NR-V2X service priority related to HFI transmission is lower than the predefined priority threshold level in relation to NR-V2X services, the response PRS reception may be performed first, and then the HFI transmission may be performed on another PSFCH resources generated later.

As a further example, when the NR-V2X service priority related to HFI transmission is lower than the predefined priority threshold level in relation to NR-V2X services, and when the positioning service priority related to response PRS reception is lower than the predefined priority threshold level in relation to positioning services, the operation order may be determined according to the UE implementation (or service policy).

4) Method of solving half-duplex problem that may occur when HFI transmission and request PRS reception are simultaneously attempted If a prior negotiation or agreement related to PRS transmission and reception is made between a positioning UE and a neighboring UE to perform on-demand positioning, the neighboring UE may expect to receive a request PRS at a specific time when a PSFCH occurs.

Method-1: It may be predefined that request PRS reception always has a higher operation priority than HFI transmission so that the request PRS reception is always performed first. To prevent a failure in request PRS reception in advance, which occurs when a request PRS transmitting UE (UE transmitting a request PRS) transmits a request PRS without knowing in advance an NR-V2X service to be performed by a request PRS receiving UE (UE receiving a request PRS), and at the same time, the request PRS receiving UE transmits HFI without receiving the request PRS, it may be defined that the request PRS receiving UE always performs request PRS reception first.

Method-2: It may be predefined that HFI transmission always has a higher operation priority than request PRS reception so that the HFI transmission is always performed first. For example, when the request PRS receiving UE receives no request PRS from the request PRS transmitting UE within a maximum latency budget from a predefined request PRS transmission time to request PRS reception, the request PRS transmitting UE may retransmit the request PRS or perform the prior negotiation or agreement related to PRS transmission and reception to a UE expected to perform request PRS reception.

Method-3: The operation priority between HFI transmission and request PRS reception may be dynamically determined according to the NR-V2X service priority and the positioning service priority.

As an example, if the NR-V2X service priority related to HFI transmission is higher than the predefined priority threshold level in relation to NR-V2X services, the UE may perform the HFI transmission first, regardless of the positioning service priority related to request PRS reception and then receive a request PRS on another PSFCH resource generated later. In this case, in order for the UE to receive the response PRS on the other PSFCH resource generated later, it is necessary to predefine an operation in which the request PRS transmitting UE repeatedly transmits the request PRS at least two times. For example, when an NR-V2X service and a sidelink positioning service are supported on a PSFCH resource, the request PRS transmitting UE may repeatedly transmit the request PRS at least two or three times. In this case, if the request PRS transmitting UE is capable of obtain information on the priority of an NR-V2X service performed by the request PRS receiving UE in advance, the request PRS transmitting UE may adjust the request PRS transmission time.

As another example, when the positioning service priority related to request PRS reception is higher than the predefined priority threshold level in relation to positioning services, and when the NR-V2X service priority related to HFI transmission is lower than the predefined priority threshold level in relation to NR-V2X services, the UE may receive a request PRS first and attempt HFI transmission on another PSFCH resource that is generated later.

As a further example, when the NR-V2X service priority related to HFI transmission is lower than the predefined priority threshold level in relation to NR-V2X services, and when the positioning service priority related to request PRS reception is lower than the predefined priority threshold level in relation to positioning services, the operation order may be determined according to the UE implementation (or service policy).

Hereinafter, there are proposed methods of solving half-duplex problems that may occur when a PSFCH resource is used to transmit and receive a request PRS and a response PRS in on-demand sidelink positioning. Here, the half-duplex problem observed in the positioning operation process may mean PRS loss that may occur in the following cases: 5) when the UE attempts to simultaneously perform request PRS transmission and response PRS reception on the same PSFCH resource; and 6) when the UE attempts to simultaneously perform response PRS transmission and request PRS reception on the same PSFCH resource. In the following, various methods of effectively solving the half-duplex problem are proposed.

5) Method of solving half-duplex problem that may occur when request PRS transmission and response PRS reception are simultaneously performed on same PSFCH resource from perspective of positioning UE
    Method-1: It may be predefined that response PRS reception always has a higher operation priority than request PRS transmission so that the response PRS reception is always performed first. When the UE moves at a high speed, response PRS reception needs to be performed immediately after request PRS transmission in order to improve positioning accuracy. To prevent a failure in response PRS reception in advance, which occurs when the response PRS transmitting UE transmits a response PRS without knowing in advance that the response PRS receiving UE intends to participate in or perform two or more different sidelink positioning services, and at the same time, the response PRS receiving UE transmits a request PRS for performing other sidelink positioning without reception of the response PRS, it may be defined that the response PRS receiving UE always performs response PRS reception before request PRS transmission.
    Method-2: It may be predefined that request PRS transmission always has a higher operation priority than response PRS reception so that the request PRS transmission is always performed first. In this case, the UE may receive a response PRS on another PSFCH resource generated later. That is, in order for the UE to receive the response PRS on the other PSFCH resource generated later, it is necessary to predefine an operation in which the response PRS transmitting UE repeatedly transmits the response PRS at least two times. For example, when one UE participates in or performs two or more sidelink positioning services on a PSFCH resource, the response PRS transmitting UE may repeatedly transmit the response PRS at least two or three times.
    Method-3: The operation priority between response PRS reception and request PRS reception may be dynamically determined according to the positioning service priority provided by the positioning UE. In the following, relevant embodiments will be described.

As an example, when the positioning service priority related to response PRS reception is higher than the positioning service priority related to request PRS transmission, the UE may first perform the response PRS reception and then attempt the request PRS transmission on another PSFCH resource that is generated later.

As another example, when the positioning service priority related to request PRS transmission is higher than the positioning service priority related to response PRS reception, the UE may first perform the request PRS transmission and then attempt the response PRS reception on another PSFCH resource that is generated later.

As another example, when the response PRS transmitting UE is capable of obtaining information on the priority of another sidelink positioning service performed by the response PRS receiving UE in advance, the corresponding UE may adjust the response PRS transmission time based on the obtained information on the priority of the positioning service.

As a further example, when the positioning service priority related to response PRS reception is equal to the positioning service priority related to request PRS transmission, the operation order may be determined according to the UE implementation (or positioning service policy).

6) Method of solving half-duplex problem that may occur when response PRS transmission and request PRS reception are simultaneously performed on same PSFCH resource from perspective of neighboring UE
    Method-1: It may be predefined that request PRS reception always has a higher operation priority than response PRS transmission so that the request PRS reception is always performed first. When the UE moves at a high speed, response PRS reception needs to be performed immediately after request PRS transmission in order to improve positioning accuracy. To prevent a failure in request PRS reception in advance, which occurs when the request PRS transmitting UE transmits a request PRS without knowing in advance that the request PRS receiving UE intends to participate in or perform two or more different sidelink positioning services, and at the same time, the request PRS receiving UE transmits a response PRS for performing other sidelink positioning without reception of the request PRS, it may be defined that the request PRS receiving UE always performs request PRS reception before response PRS transmission.
    Method-2: It may be predefined that response PRS transmission always has a higher operation priority than request PRS reception so that the response PRS transmission is always performed first. In this case, the UE may receive a request PRS on another PSFCH resource generated later. That is, in order for the UE to receive the request PRS on the other PSFCH resource generated later, it is necessary to predefine an operation in which the request PRS transmitting UE repeatedly transmits the request PRS at least two times. For example, when one UE participates in or performs two or more sidelink positioning services on a PSFCH resource, the response PRS transmitting UE may repeatedly transmit the response PRS at least two or three times.

Method-3: The operation priority between response PRS transmission and request PRS reception may be dynamically determined according to the positioning service priority provided by the positioning UE. In the following, relevant embodiments will be described.

As an example, when the positioning service priority related to response PRS transmission is higher than the positioning service priority related to request PRS reception, the UE may first perform the response PRS reception and then attempt the request PRS reception on another PSFCH resource that is generated later.

As another example, when the request PRS transmitting UE is capable of obtaining information on the priority of another sidelink positioning service performed by the request PRS receiving UE in advance, the corresponding UE may adjust the request PRS transmission time based on the obtained information on the priority of the positioning service.

As another example, when the positioning service priority related to request PRS reception is higher than the positioning service priority related to response PRS transmission, the UE may first perform the request PRS reception and then attempt the response PRS transmission on another PSFCH resource that is generated later.

As a further example, when the positioning service priority related to response PRS transmission is equal to the positioning service priority related to request PRS reception, the operation order may be determined according to the UE implementation (or positioning service policy).

Embodiment 3

In the present embodiment, there are proposed various methods of solving power sharing (or power control) problems that may occur when a request PRS (or TX-PRS) and a response PRS (or RX-PRS) are simultaneously transmitted in the on-demand sidelink positioning process of the NR-V2X system.

When the UE is requested by higher layers to perform and participates in positioning, the UE may transmit a request PRS and a response PRS in the same transmission slot, i.e., on the same PSFCH resource.

The positioning service priority may vary depending on the location based service (LBS) that the UE intends to perform, which may be provided in first-stage SCI/first SCI on a PSCCH and/or second stage SCI/second SCI on a PSSCH.

Hereinafter, a description will be given of power sharing methods for minimizing a request PRS transmission power loss problem or a response PRS transmission power loss problem which may occur when a UE attempts to simultaneously perform request PRS transmission and response PRS transmission on a PSFCH resource placed at the same time/time point in the on-demand sidelink positioning process in order to serve as a positioning UE and a neighboring UE. The transmission power loss problem may cause reception performance degradation such as a decrease in the coverage of a transmitting UE and a decrease in the SNR of a receiving UE. Therefore, the present embodiment proposes various methods for effectively solving the above-described power sharing problem.

The power sharing problem that may occur when the UE attempts to simultaneously perform request PRS transmission and response PRS transmission on the same PSFCH resource may be effectively solved by considering the positioning service priority (PPPS) related to the request PRS transmission and the positioning service priority related to the response PRS transmission.

As an embodiment, when the positioning service priority related to request PRS (or response PRS) transmission is higher than a predefined priority threshold ((pre-)configured PPPS threshold) level in relation to positioning services, the power for request PRS (or response PRS) transmission may be allocated in proportion to the priority of the corresponding positioning service. On the other hand, when the positioning service priority related to request PRS (or response PRS) transmission is lower than or equal to the predefined priority threshold level in relation to positioning services, power for request PRS (or response PRS) transmission may be reduced or may not be allocated. In this case, the (pre-)configured PPPS threshold may be predefined, or the (pre-)configured PPPS threshold may be determined by the location server/LMF and/or BS.

Hereinafter, various power sharing methods for a PRS and methods of transmitting a request PRS and a response PRS based on the same be described in detail.

Method-1: It may be predefined that power sharing is not allowed between response PRS transmission and request PRS transmission and power is allocated only to the response PRS transmission. That is, the positioning service priority threshold related to response PRS transmission may be set to the lowest, that is, the positioning service priority threshold level related to response PRS transmission may be to the highest, but the positioning service priority threshold related to request PRS transmission may be to the highest, that is, the positioning service priority threshold level related to request PRS transmission may be set to the lowest. By doing so, all power may be allocated only to the response PRS transmission, and the request PRS transmission may be dropped.

Method-2: It may be predefined that power sharing is not allowed between request PRS transmission and response PRS transmission and power is allocated only to the request PRS transmission. That is, the positioning service priority threshold related to request PRS transmission may be set to the lowest, but the positioning service priority threshold related to response PRS transmission may be to the highest. By doing so, all power may be allocated only to the request PRS transmission, and the response PRS transmission may be dropped.

Method-3: The total power may be shared to simultaneously transmit a response PRS and a request PRS. That is, when the positioning service priority related to response PRS transmission is higher than the predefined priority threshold, and when the positioning service priority related to request PRS transmission is higher than the predefined priority threshold, 1) the power for response PRS transmission and request PRS transmission may be distributed in proportion to the positioning service priority related to response PRS transmission and the positioning service priority related to request PRS transmission, 2) the power for response PRS transmission and request PRS transmission may be equally distributed, or 3) the power for response PRS transmission and request PRS transmission may be applied by calculating, distributing, and/or configuring the power for response PRS transmission and the power for request PRS transmission in advance.

When the positioning service priority related to response PRS transmission is lower than or equal to the predefined priority threshold, and when the positioning service priority related to request PRS transmission is lower than or equal to the predefined priority threshold, the total power (or available PRS power) may be shared or distributed for response PRS transmission and request PRS transmission as in Method-3 of the present embodiment.

In the following, a description will be given of a method by which a UE performs power sharing ((pre-)configured power sharing) by calculating and/or configuring power in advance when the UE attempts to simultaneously perform request PRS transmission and response PRS transmission on the same PSFCH resource.

As an example, when request PRS transmission and response PRS transmission are simultaneously performed on the same PSFCH resource, the power for request PRS transmission and the power for response PRS transmission may be equally shared within the available PRS power.

As another example, when request PRS transmission and response PRS transmission are simultaneously performed on the same PSFCH resource, the power for request PRS transmission and the power for response PRS transmission may be calculated, distributed, and/or configured in advance and then applied.

As another example, when request PRS transmission and response PRS transmission are simultaneously performed on the same PSFCH resource, the ratio between the power for request PRS transmission and the power for response PRS transmission may be calculated, distributed, and/or configured in advance and then applied.

Hereinafter, a description will be given of a method by which a UE performs power sharing based on the priority of a positioning service related to response PRS transmission when the UE attempts to simultaneously perform request PRS transmission and response PRS transmission on the same PSFCH resource.

As an example, when the positioning service priority related to response PRS transmission is higher than a predefined priority threshold level, the UE may drop the request PRS transmission or reduce the power for request PRS transmission to improve the reliability of the response PRS transmission.

As another example, when the positioning service priority related to response PRS transmission is lower than or equal to the predefined priority threshold level, the UE may share the power for request PRS transmission.

As another example, the power for response PRS transmission and the power for request PRS transmission may be calculated, distributed, configured in advance and then applied according to the positioning service priority related to response PRS transmission.

As another example, the ratio between the power for response PRS transmission and the power for request PRS transmission may be calculated, distributed, and/or configured in advance and then applied according to the positioning service priority related to response PRS transmission.

As a further example, the power for response PRS transmission and the power for request PRS transmission may be equally distributed and shared regardless of the positioning service priority.

Hereinafter, a description will be given of a method by which a UE shares power for request PRS transmission power and power for response PRS transmission based on sensing of positioning service signal quality when the UE attempts to simultaneously perform request PRS transmission and response PRS transmission on the same PSFCH resource.

As an example, power sharing may be performed based on an RSSI or RSRP value measured when a positioning service signal related to response PRS transmission is received and an RSSI or RSRP value measured when a request PRS is received.

When the RSSI or RSRP value measured when receiving the positioning service signal related to response PRS transmission is lower than or equal to a specific threshold, the UE may allocate no power for request PRS transmission for highly reliable response PRS transmission.

When the RSSI or RSRP value measured when receiving the positioning service related to response PRS transmission is higher than the specific threshold, the UE may determine that the power for response PRS transmission is sufficient and share the total power, i.e., available PRS power for request PRS transmission. In this case, the power for request PRS transmission may be allocated as follows.

As an example, the power for response PRS transmission and the power for request PRS transmission may be calculated, distributed, and/or configured in advance and then applied according to the measured RSSI or RSRP value.

As another example, the ratio between the power for response PRS transmission and the power for request PRS transmission may be calculated, distributed, and/or configured in advance and then applied according to the measured RSSI or RSRP value.

As a further example, the power for response PRS transmission and the power for request PRS transmission may be equally shared regardless of the measured positioning service signal quality.

Embodiment 4

The present embodiment relates to methods of managing dedicated resources for positioning data transmission in the NR-V2X system. In particular, in this embodiment, there are proposed various dedicated resource pool structures for positioning data transmission, which are different from resources for conventional V2X data transmission, and management methods therefor. The management of independent dedicated resource pools for positioning data may satisfy positioning service requirements, which need to provide location information through fast positioning. However, when there is no positioning data transmission, the management of dedicated resource pools for positioning data may reduce the efficiency of V2X data transmission and the overall efficiency of sidelink resource use.

In the present embodiment, there is proposed a method of using positioning data dedicated resources only when there is a request for positioning data transmission and using a positioning data dedicated resource pool for V2X data transmission when there is no request for positioning data transmission.

In addition, there is proposed a pre-emption method for performing positioning data transmission by reserving positioning dedicated data resources regardless of V2X data transmission if there is a request for positioning data transmission while the corresponding resources are used for the V2X data transmission. The following is a description of the terms used herein.

Positioning data resource: The positioning data resource means a V2X sidelink resource allocated for transmission of positioning related data and control signals. The transmitted data and control signals are as follows.

Data: The data may be transmitted on a PSSCH, and information measured and reported by the UE such as time of arrival (ToA)/angle of arrival (AoA)/Doppler may be included.

Control signal: The control signal may include first-stage SCI/first SCI (or sidelink positioning control information (SPCI)) transmitted on a PSCCH and second-stage SCI/second SCI (or SPCI) transmitted on a PSSCH.

Positioning data slot: The positioning data slot means a slot including a V2X sidelink resource allocated for transmission of positioning related data and control signals.

V2X data resource: The V2X data resource means a V2X sidelink resource allocated for transmission of NR-V2X data (message, voice, video, etc.) and related control signals.

UE: The UE may include a mobile device, a V2X module, an IoT device, and the like.

AN (Anchor Node): The AN may be a BS and/or UE. When a BS serves as the AN, the BS may include an eNB, a gNB, an LTE-LAA, an NR-U, a transmission point (TP), a remote head control (RHC), a gNB-type road side unit (RSU), a UE-type RSU, and so on, which are capable of providing fixed (or absolute) location information. In addition, when a UE serves as the AN, the UE may include a UE capable of providing highly reliable location information, a UE-type RSU that provides fixed location information, and the like.

Sidelink positioning may include on-demand positioning and broadcast positioning.

Hereinafter, a description will be given of various dedicated resource pool structures for transmission of positioning data and control information and management methods therefor.

Figure 12:
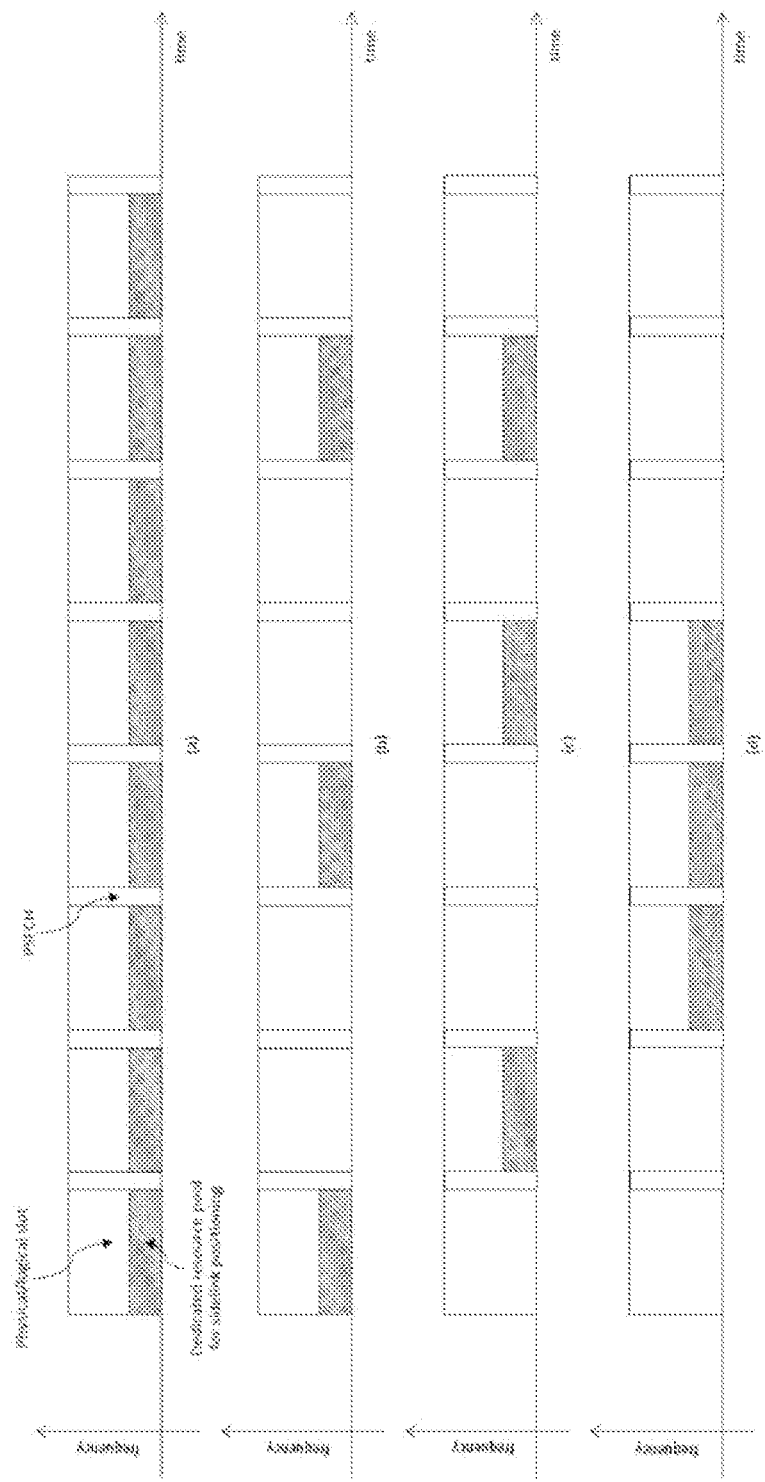
FIG. 12 is a diagram for explaining a positioning reference signal (PRS) transmission method preconfigured for sidelink on-demand positioning according to an embodiment.

FIG. 12 is a diagram for explaining dedicated resource pool structures for positioning data transmission according to an embodiment.

Referring to FIG. 12, the proposed dedicated resource pool structures for transmission of positioning data and/or positioning related control information may include: (a) a dedicated and continuous resource pool structure; (b) a dedicated and periodic resource pool structure; (c) a dedicated and aperiodic resource pool structure; and (d) a dedicated and burst resource pool structure.

Hereinafter, the characteristics and management method of each positioning dedicated resource pool structure will be described. In the following, it is assumed that positioning data is transmitted in a positioning dedicated resource pool, but this is merely exemplary. That is, positioning related control information may be transmitted in the positioning dedicated resource pool, or positioning data and positioning related control information may be transmitted together in the positioning dedicated resource pool.

(1) Dedicated and Continuous Resource Pool Structure

As shown in FIG. 12(a), a dedicated resource (or positioning data slot) pool for positioning data transmission may be continuously allocated in the time domain. Here, a resource for transmission of positioning related data in each positioning data slot may include at least one sub-channel, and one or more UEs and/or ANs may use at least one sub-channel. In this case, the number of UEs and/or ANs capable of using the same positioning data slot and the number of sub-channels used by each UE and/or AN may be predefined or determined by the location server/LMF and/or BS.

A dedicated resource for positioning data transmission in each positioning data slot may be positioned at the same frequency location (or resource) (or the same RB location (resource)) for all positioning data slots, or the dedicated resource for positioning data transmission may be positioned at a different frequency location (or resource) for each positioning data slot based on frequency hopping. FIG. 12(a) shows an embodiment in which a resource for positioning data transmission in each positioning data slot is disposed at the same frequency location for all positioning data slots.

When the dedicated resource for positioning data transmission in each positioning data slot includes at least one sub-channel, each sub-channel may be arranged continuously or separately. Alternatively, each group consisting of continuous sub-channels may be arranged separately. FIG. 12(a) shows an embodiment in which sub-channels are arranged continuously. In this case, the number of continuous sub-channels may be determined according to the number of continuous sub-channels configured for V2X data transmission, or the number of continuous sub-channels may be arbitrarily determined.

For example, if the minimum number of continuous sub-channels for V2X data transmission is "X", the minimum number of continuous sub-channels for positioning data transmission may be determined as an integer multiple of "X". If there is no positioning data transmission, the configuration of positioning dedicated data resource in consideration of V2X data transmission resources may allow effective V2X data transmission in a positioning dedicated data resource pool, thereby increasing the V2X data transmission rate and sidelink resource use efficiency.

(2) Dedicated and Discontinuous Resource Pool Structure

FIGS. 12(b) to 12(d) show examples of a dedicated and discontinuous resource pool structure. Specifically, FIG. 12(b) shows a dedicated and periodic resource pool structure, FIG. 12(c) shows a dedicated and aperiodic resource pool structure, and FIG. 12(d) shows a dedicated and burst resource pool structure.

As shown in FIGS. 12(b) to 12(d), a positioning dedicated data resource pool (or positioning data slot) may be allocated and disposed non-continuously (or discontinuously) in the time domain. Hereinafter, the characteristics and management methods of the dedicated and periodic resource pool structure, the dedicated and aperiodic resource pool structure, and the dedicated and burst resource pool structure will be described in detail.

Dedicated and Periodic Resource Pool Structure

As shown in FIG. 12(b), a dedicated resource pool (or positioning data slot) for positioning data transmission may be allocated and arranged periodically in the time domain. In this case, a slot period in which the positioning dedicated data resource is generated on sidelink resources may be predefined, or the slot period may be determined by the location server/LMF and/or BS. The dedicated and periodic resource pool structure according to FIG. 12(b) has the advantage of improving the efficiency of V2X data transmission and the overall efficiency of sidelink resource use, compared to the dedicated and continuous resource pool structure of FIG. 12(a). On the other hand, when there is a request for positioning data transmission in a slot that is not allocated as the positioning dedicated data resource, the UE may need to wait until the next positioning dedicated data resource is available, and as a result, positioning data transmission may be delayed by the corresponding waiting time.

A sub-channel for transmitting positioning related data in each positioning data slot may be configured and managed similarly to FIG. 12(a).

The frequency location (or resource) of a dedicated resource for positioning data transmission in each positioning data slot may be configured and managed similarly to FIG. 12(a).

Dedicated and Aperiodic Resource Pool Structure

As shown in FIG. 12(c), a dedicated resource pool for positioning data transmission may be allocated and arranged aperiodically in the time domain. In this case, a rule for generating a positioning data slot on sidelink resources may be predefined, or the rule may be determined by the location server/LMF and/or BS. Similarly to the dedicated and periodic resource pool structure, the dedicated and aperiodic resource pool structure may improve the efficiency of V2X data transmission and the overall efficiency of sidelink resource use, compared to the dedicated and continuous resource pool structure of FIG. 12(a).

A sub-channel for transmitting positioning related data in each positioning data slot may be configured and managed similarly to FIG. 12(a).

The frequency location of a dedicated resource for positioning data transmission in each positioning data slot may be configured and managed similarly to FIG. 12(a).

Dedicated and Burst Resource Pool Structure

As shown in FIG. 12(d), dedicated resource pools for positioning data transmission may be concatenated in the time domain. In this case, a rule for generating concatenated positioning data slots on sidelink resources may be predefined, or the rule may be determined by the location server/LMF and/or BS. The dedicated and burst resource pool structure may improve the efficiency of V2X data transmission and the overall efficiency of sidelink resource use, compared to the dedicated and continuous resource pool structure of FIG. 12(a). On the other hand, when there is a request for positioning data transmission in a slot that is not allocated as the positioning dedicated data resource, the UE needs to wait until the next positioning dedicated data resource is available, and as a result, positioning data transmission may be delayed by the corresponding waiting time.

A sub-channel for transmitting positioning related data in each positioning data slot may be configured and managed similarly to FIG. 12(a).

The frequency location (or resource) of a dedicated resource for positioning data transmission in each positioning data slot may be configured and managed similarly to FIG. 12(a).

Hereinafter, a description will be given of methods of solving the problem that the V2X data transmission rate (or transmission efficiency) and the overall sidelink resource use efficiency are degraded, which is caused by management of dedicated data resource pools. That is, when there is no positioning data transmission in a positioning dedicated data resource pool or when the positioning data transmission occurs intermittently, if the number of UEs intending to transmit V2X data increases, the overall utilization of sidelink resources may be significantly reduced. To solve this problem, the following methods may be used.

Specifically, a positioning dedicated data resource may be used for positioning data transmission only when there is a request for positioning data transmission. When there is no request for positioning data transmission, the positioning dedicated data resource may be used for V2X data transmission. Hereinafter, an operation and procedure in which the UE transmits V2X data on the positioning dedicated data resource will be described. In this case, it is assumed that the UE operates in NR-V2X mode-2. In NR-V2X mode-1, the BS may detect a PSFCH-PRS resource and a PRS ID that may be reserved for the positioning UE. On the other hand, in NR-V2X mode-2, the PSFCH-PRS resource and the PRS ID that may be reserved for a positioning UE may be detected by analysis of first-stage SCI on a PSCCH and/or second-stage SCI on a PSSCH, which are received (or sensed) from a neighboring UE.

The UE may perform sensing of a V2X sidelink resource pool during an "observation window" period to reserve resources for V2X data transmission. Then, the UE may analyze the utilization (or occupancy) of a V2X data resource pool and a positioning dedicated data resource pool, based on resource reservation information included in the first-stage SCI on the PSCCH and/or the second-stage SCI on the PSSCH received from the neighboring UE.

When higher layers have V2X data to be transmitted, the UE may determine whether to transmit the V2X data in a V2X data resource pool or a positioning dedicated data resource pool by analyzing sensing results for sidelink resource pools.

Hereinafter, a method for a UE to determine which resource pool among a V2X data resource pool and a positioning dedicated data resource pool the UE uses to transmit V2X data will be described.

As a first method, if the utilization of the V2X data resource pool is less than a specific threshold, the UE may select the V2X data resource pool as a resource for V2X data transmission. On the other hand, if the utilization of the V2X data resource pool is greater than or equal to the specific threshold, the UE may select the positioning dedicated data resource pool for V2X data transmission.

As a second method, regardless of the utilization of the V2X data resource pool, the UE may always reserve positioning data resources that are not used or not reserved by neighboring UEs and use the reserved positioning data resources for V2X data transmission. That is, in the case of V2X data transmission, the positioning dedicated data resource pool may be considered as a virtual V2X data resource pool.

The UE may reserve resources for V2X data transmission from the selected resource pool.

Hereinafter, a positioning dedicated data resource pool and a resource reservation method based on the positioning dedicated data resource pool will be described in detail.

When the UE transmits V2X data in the V2X data resource pool, the UE may select and reserve a V2X data resource that is not used or not reserved by neighboring UEs among V2X data resources according to a predetermined protocol.

When the UE transmits V2X data in the positioning dedicated data resource pool, the UE may select and reserve a positioning data resource that is not used or reserved by neighboring UEs according to a predetermined protocol by analyzing sensing results for the positioning dedicated data resource pool.

When the UE transmits V2X data on a positioning dedicated data resource, the UE may transmit to neighboring UEs first-stage SCI on a PSCCH and/or second-stage SCI on a PSSCH including indicator (V2X data indicator) information indicating that the V2X data is transmitted. When there is an urgent request for positioning data transmission while the positioning dedicated data resource is being used for V2X data transmission, the V2X_data indicator information may be effectively used to apply pre-emption, so that the positioning data transmission may be performed regardless of the V2X data transmission. In other word, the pre-emption may be applied to the positioning dedicated data resource related to the V2X_data_indicator.

Hereinafter, a description will be given of pre-emption operations and procedures for pre-emptying a positioning dedicated data resource to perform positioning data transmission regardless of V2X data transmission when there is an urgent request for the positioning data transmission while the positioning dedicated data resource is being used for the V2X data transmission. In this case, it is assumed that the UE operates in NR-V2X mode-2.

The UE may perform sensing of a positioning dedicated data resource pool during an "observation window" period to reserve resources for positioning data transmission. Then, the UE may analyze the utilization (or occupancy) and resource reservation statuses of resources for positioning data transmission and V2X data transmission based on resource reservation information included in first-stage SCI on a PSCCH and/or second-stage SCI on a PSSCH received from a neighboring UE. In this case, the usage status of positioning dedicated resources for V2X data transmission may be analyzed based on the V2X_data_indicator described above.

When the UE is requested by higher layers to perform positioning and positioning data transmission, the UE may determine whether to apply the pre-emption to resources within a "selection window" period by analyzing the results obtained from sensing of the positioning dedicated data resource pool. In the following, the features of pre-emption operations will be described in detail.

If there are positioning data resources not used or reserved by neighboring UEs within a latency budget for positioning data transmission, the UE may apply no pre-emption. The latency budget for positioning data transmission may be predefined according to the priority or importance of positioning data or determined by the location server/LMF and/or BS. The latency budget represents the maximum time (or delay time) allowed for the UE to transmit a positioning related PRS and positioning data after receiving a request for positioning and positioning data transmission from higher layers. Therefore, the UE needs to successfully transmit the PRS and positioning data within the latency budget. If the UE does not successfully transmit the PRS and positioning data within the latency budget, the UE may wait until the higher layers request the positioning and positioning data transmission.

If there are no positioning data resources that are not used or reserved by neighboring UEs within the latency budget for positioning data transmission, but if there are resources used or reserved for V2X data transmission, the UE may apply the pre-emption to the corresponding resources. In this case, the UE may recognize whether to transmit V2X data on a positioning dedicated data resource, based on the V2X data indicator information described above. Hereinafter, a method of selecting a resource to which the pre-emption is applied will be described.

Based on the priority or importance of V2X data included in first-stage SCI and/or second-stage SCI on a PSSCH, the UE may select a positioning dedicated resource to which the pre-emption is to be applied as follows.

As an example, the UE may select a positioning dedicated resource used for transmission of V2X data with the lowest priority as a resource for positioning data transmission. In this case, if there are multiple resources with the same priority, the UE may perform the following pre-emption operation: selecting a positioning dedicated resource closest to the time when positioning and positioning data transmission are requested by higher layers or selecting any resource in a random manner.

As another example, the UE may perform the following pre-emption operation: selecting a positioning dedicated resource closest to the time when positioning and positioning data transmission are requested from higher layers from among one or more positioning dedicated resources used for transmission of V2X data with a priority lower than the predefined priority or selecting any resource in a random manner.

As a further example, the UE may perform the following pre-emption operation: selecting a positioning dedicated resource used for V2X data transmission and closet to the time when positioning and positioning data transmission are requested by higher layers, regardless of the priority of V2X data.

When positioning dedicated data resources reserved for V2X data transmission are pre-empted by neighboring UEs, the UE may reserve a new resource for V2X data transmission or restart the V2X data transmission on the remaining reserved resources after waiting until the corresponding pre-emption operation is completed.

In an embodiment, when there are no positioning data resources not used or reserved by neighboring UEs within the latency budget for positioning data transmission, and when all resources are used or reserved for positioning data transmission, the pre-emption may be applied. Hereinafter, the features of related pre-emption operations will be described in detail.

Based on the priority or importance of positioning data included in first-stage SCI or second-stage SCI on a PSSCH, the UE may select a positioning dedicated resource to which the pre-emption is to be applied as follows.

As an example, the UE may perform the following pre-emption operation: selecting a positioning dedicated resource for transmission of positioning data with the lowest priority as a resource for positioning data transmission. In this case, if there are multiple resources with the same priority, the UE may select a positioning dedicated resource closest to the time point when positioning and positioning data transmission are requested by higher layers or may select any resource in a random manner.

As another example, the UE may select a positioning dedicated resource closest to the time when positioning and positioning data transmission are requested by higher layers from among positioning dedicated resources used for transmission of positioning data with a priority lower than the predefined priority or select any resource in a random manner.

As a further example, the UE may perform the following pre-emption operation: selecting a positioning dedicated resource closest to the time when positioning and positioning data transmission are requested by higher layers, regardless of the priority of positioning data. When reserved resources are pre-empted by neighboring UEs, the UE may reserve a new resource for positioning data transmission or restart the positioning data transmission on the remaining reserved resources after waiting until the corresponding pre-emption operation is completed.

In the description of Embodiments 1 to 4, the term 'predefined' may be interpreted to mean the following: 'defined through RRC signaling' or 'defined through physical layer signaling'.

Figure 13:
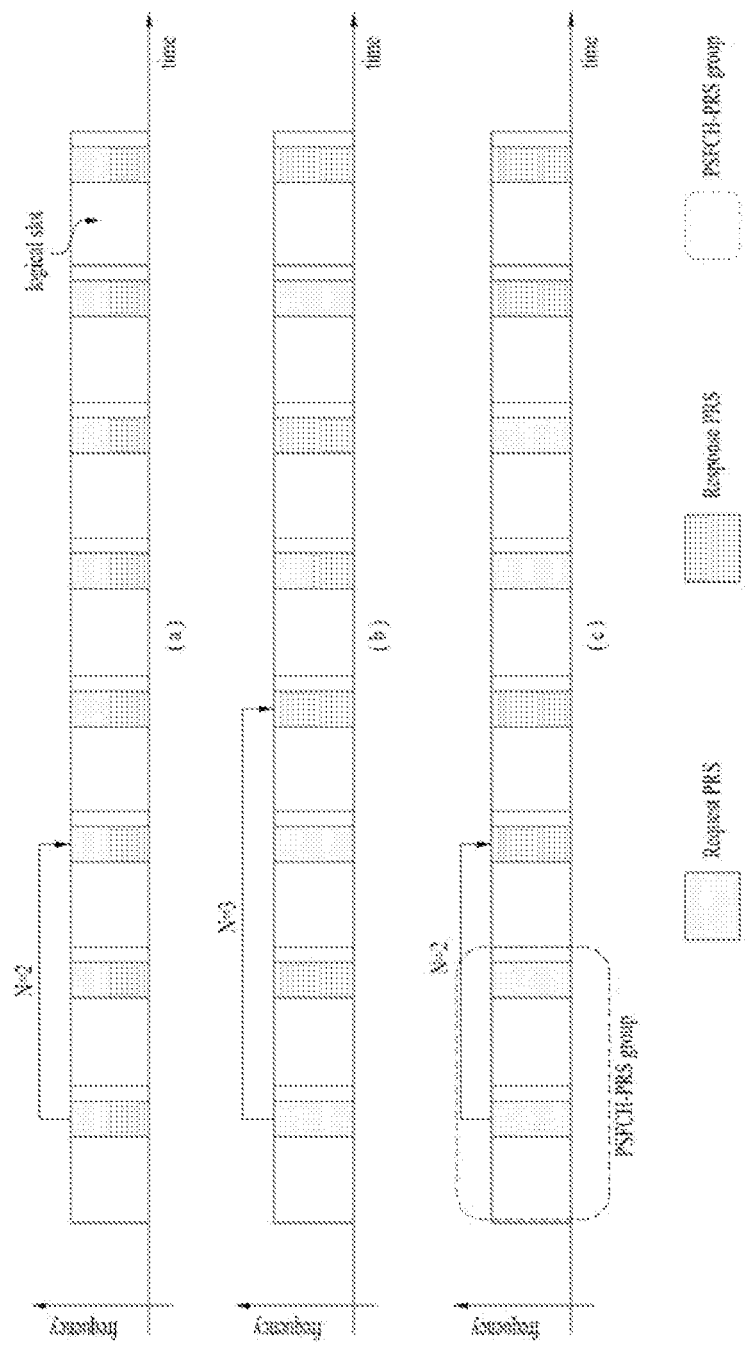
FIG. 13 is a flowchart for explaining a sidelink on-demand positioning procedure for a positioning UE according to an embodiment.

FIG. 13 is a diagram for explaining PRS transmission resource allocation methods for sidelink on-demand positioning according to an embodiment.

Referring to FIG. 13, the PRS transmission resource allocation methods may be divided into a method of transmitting a request PRS and a response PRS on the same PSFCH-PRS resource (FIG. 13 (a)), a method of transmitting a request PRS and a response PRS on different PSFCH-PRS resources (FIG. 13 (b)), and a method of transmitting a request PRS and a response PRS on different PSFCH-PRS group resources (FIG. 13 (c)).

A PSFCH transmission resource may be allocated to a specific symbol in a specific logical slot on a specific sub-channel. For example, the PSFCH transmission resource may be allocated to the last two symbols of the corresponding slot, and frequency resources for PSFCH transmission may be indicated by a bitmap for RBs in a corresponding resource pool.

For each PSFCH, an ACK resource and a NACK resource may be allocated to different subchannels. SFCI transmitted on the PSFCH may be a sequence based signal. For example, a one-bit ACK/NACK may be identified by different cyclic shifts of the same base sequence. The PSCCH, PSSCH, and PSFCH may be multiplexed and transmitted within the same slot in In this case, the PSCCH and PSSCH may be multiplexed in the time domain and the frequency domain.

Referring to FIG. 13(a), it may be seen that different UEs are capable of performing request PRS transmission or response PRS transmission on the same PSFCH-PRS resource. In this case, a request PRS ID for request PRS transmission and a response PRS ID for response PRS transmission may be selected from a PRS ID set or pool defined on the same PSFCH-PRS resources.

Referring to FIG. 13(a), the UE may transmit a request PRS and a response PRS at the same time on the same PSFCH-PRS resource.

In FIG. 13(a), the UE may transmit a request PRS and receive a response PRS from a neighboring UE at the same time on the same PSFCH-PRS resource.

In FIG. 13(a), the UE may transmit a response PRS and receive a request PRS from a neighboring UE at the same time on the same PSFCH-PRS resource.

Referring to FIG. 13(b), a PSFCH-PRS resource for request PRS transmission and a PSFCH-PRS resource for response PRS transmission may be allocated to different slots and transmitted alternately. In this case, a request PRS and a response PRS may be preconfigured to be transmitted only on the corresponding PSFCH-PRS resources, respectively. Here, a request PRS ID for request PRS transmission and a response PRS ID for response PRS transmission may be selected from a PRS ID set or pool defined on different PSFCH-PRS resources.

Referring to FIG. 13(c), it may be seen that a PSFCH-PRS group resource for request PRS transmission and a PSFCH-PRS group resource for response PRS transmission are arranged in different slots and alternately allocated. In this case, a request PRS and a response PRS may be transmitted only on the corresponding PSFCH-PRS group resources, respectively.

In an embodiment, a PSFCH-PRS group may consist of one or more PSFCH-PRS resources in FIG. 13 (c). Each PSFCH-PRS resource in the PSFCH-PRS group may be used to transmit different types of PRS (request or response).

In another embodiment, each PSFCH-PRS resource in the PSFCH-PRS group may be used to repeatedly transmit the same type of PRS. In another embodiment, each PSFCH-PRS resource in the PSFCH-PRS group may be used to transmit a related PRS, such as transmitting the same type of PRS based on frequency hopping.

Referring to FIG. 13, the difference between a time at which a request PRS is transmitted and a time at which a response PRS is transmitted in response to the request PRS (i.e., a time gap between the request PRS and response PRS, n) may be predefined and configured.

Figure 14:
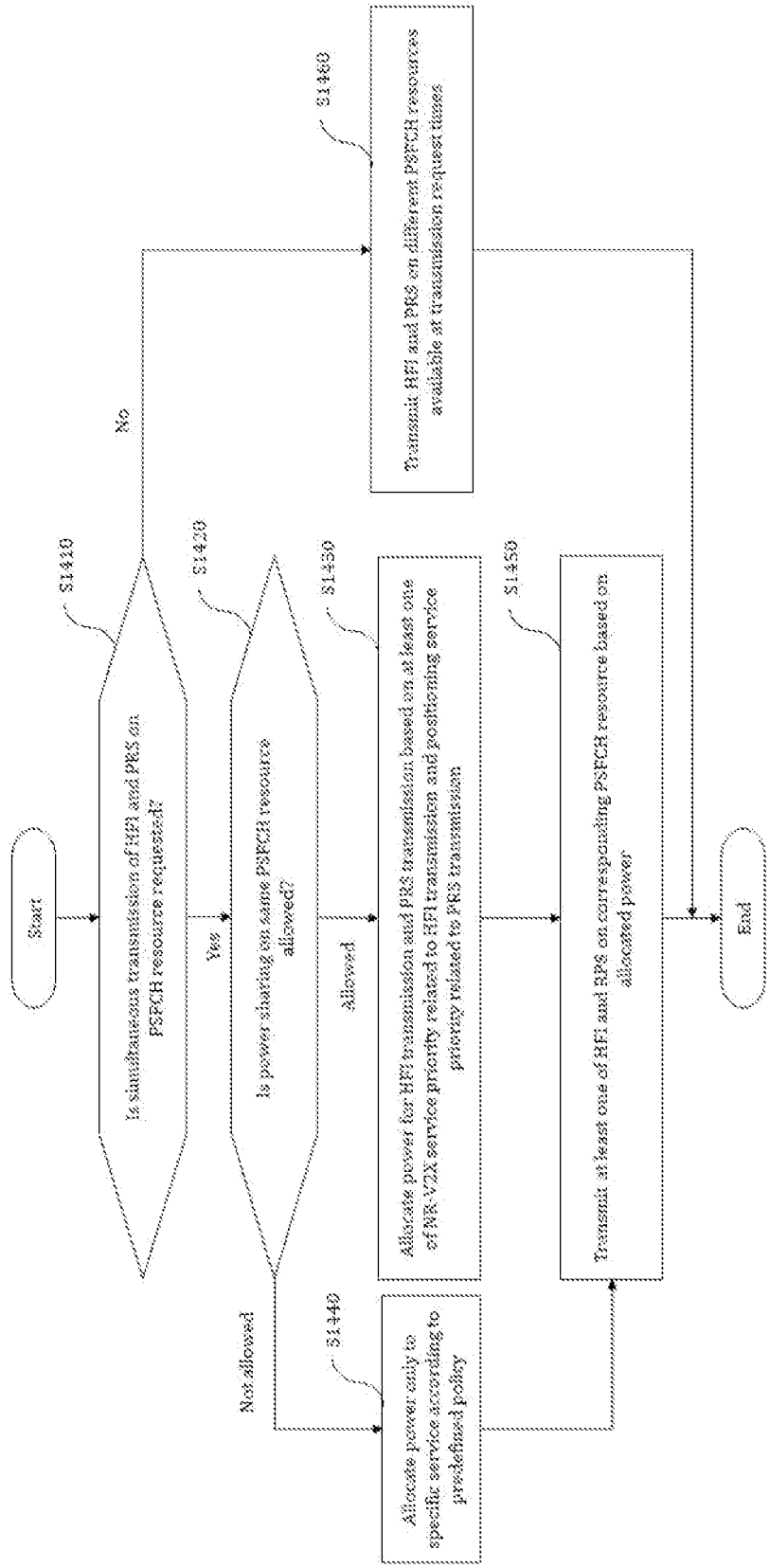
FIG. 14 is a diagram for explaining a method by which a neighboring UE transmits a response PRS when a V2X data slot is pre-reserved at a time point when the response PRS needs to be transmitted according to an embodiment.

FIG. 14 is a diagram for explaining a method by which a UE shares power when supporting different heterogeneous services on a PSFCH resource in the NR-V2X system according to an embodiment.

Referring to FIG. 14, when HFI transmission resources for NR-V2X services and PRS resources for sidelink positioning services are configured on a PSFCH, the UE may determine whether HFI transmission and PRS (request PRS and/or response PRS) transmission are requested by higher layers at the same time point (S1410). Here, the same time point means the same PSFCH transmission slot (resource).

When it is determined that the HFI transmission and PRS transmission are requested at the same time point, the UE may determine whether power sharing on the same PSFCH resource is allowed (S1420). As an example, whether the power sharing is allowed may be determined based on the NR-V2X service priority related to the HFI transmission. As another example, whether the power sharing is allowed may be determined based on the RSSI or RSRP value measured when an NR-V2X service packet (data or signal) related to the HFI transmission is received.

When it is determined that the power sharing is allowed, the UE may allocate the total power for the HFI transmission and PRS transmission, for example, available power on the corresponding PSFCH resource, based on at least one of the NR-V2X service (or packet) priority related to the corresponding HFI transmission and the positioning service priority related to the corresponding PRS transmission (S1430). Here, the allocation/distribution/sharing of the heterogeneous service power based on the service priority may be performed as described above in Embodiment 1.

When it is determined in step 1420 that the power sharing is not allowed, the UE may allocate the total power only for either the HFI transmission or the PRS transmission according to a predefined policy (S1440). Here, the total power may mean the power allocated to the corresponding PSFCH transmission resource.

The UE may transmit at least one of the HFI and RPS on the corresponding PSFCH resource based on the allocated power (S1450).

When it is determined in step 1410 that the HFI transmission and PRS transmission are not requested at the same time point, the UE may transmit each of the HFI and PRS on a PSFCH resource available at each transmission request time (S1460).

Figure 15:
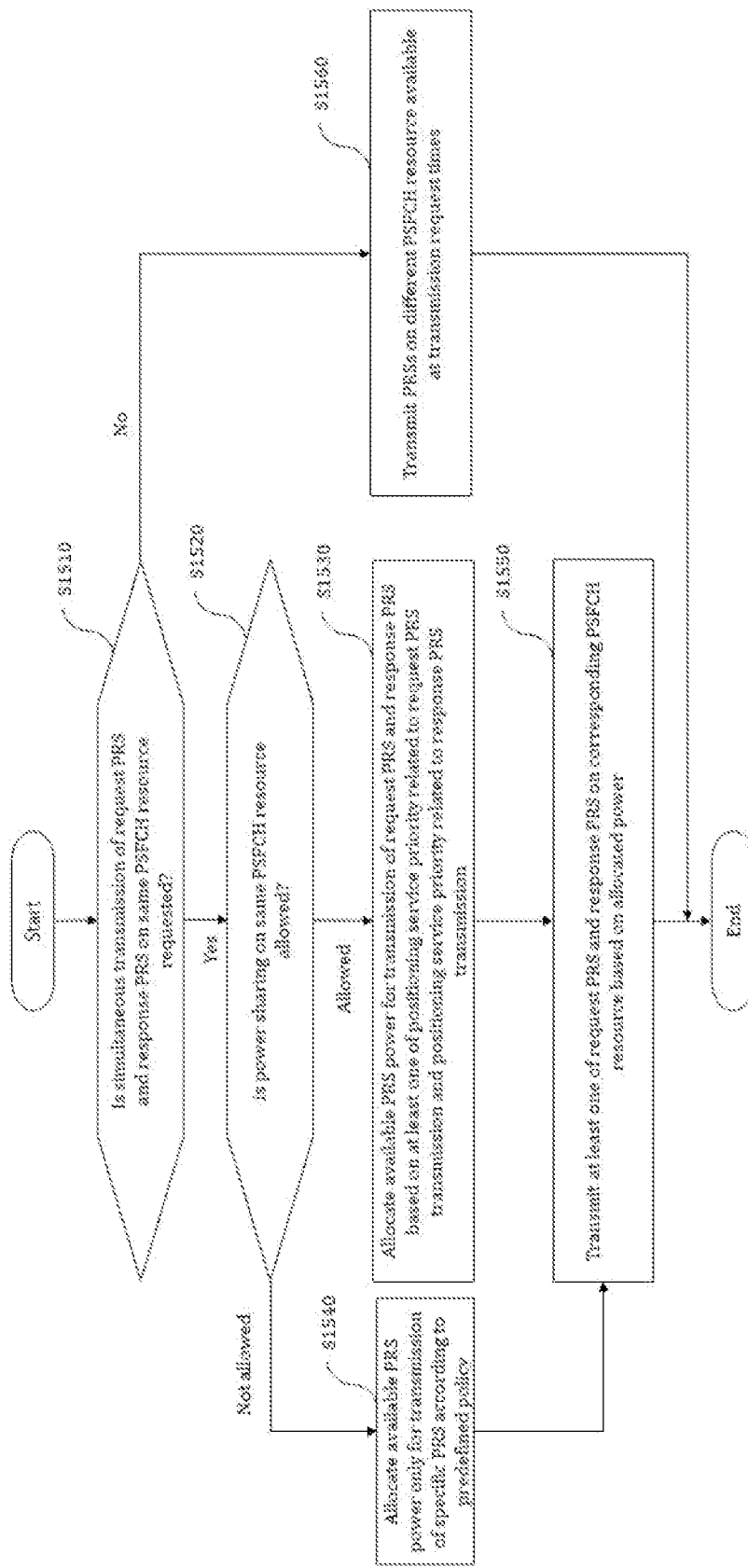
FIG. 15 is a diagram for explaining a method by which a neighboring UE transmits a response PRS when a V2X data slot is pre-reserved at a time point when the response PRS needs to be transmitted according to another embodiment.

FIG. 15 is a diagram for explaining a method by which a UE shares power when performing different positioning services on the same PSFCH resource in the NR-V2X system according to an embodiment.

Referring to FIG. 15, when a request PRS transmission resource and a response PRS transmission resource are preconfigured on one PSFCH resource, the UE may determine whether request PRS transmission and response PRS transmission are requested at the same time point (S1510). Here, the same time point means the same PSFCH transmission slot (resource).

When it is determined that the request PRS transmission and response PRS transmission are requested at the same time point, the UE may determine whether power sharing on the same PSFCH resource is allowed (S1520). As an example, whether the power sharing is allowed may be determined based on the positioning service priority related to a request PRS and/or response PRS. As another example, whether the power sharing is allowed may be determined based on the RSSI or RSRP value of positioning service signals sensed in relation to the request PRS and/or response PRS.

When it is determined that the power sharing is allowed, the UE may allocate the total power, for example, PRS power available on the corresponding PSFCH resource, for the request PRS transmission and response PRS transmission based on at least one of the positioning service priority related to the request PRS transmission and the positioning service priority related to the response PRS transmission (S1530). Here, the allocation/distribution/sharing of the PRS power based on the positioning service priority of the request PRS (TX-PRS) and the response PRS (RX-PRS) may be performed as described above in Embodiment 3.

When it is determined in step 1520 that the power sharing is not allowed, the UE may allocate the total power, i.e., all available PRS power only for either the request PRS transmission or the response PRS transmission according to a predefined policy (S1540).

The UE may transmit at least one of the request PRS and the response PRS on the corresponding PSFCH resource based on the allocated power (S1550).

When it is determined in step 1510 that the request PRS (TX-PRS) transmission and the response PRS (RX-PRS) transmission are not requested at the same time point, the UE may transmit the corresponding PRS on a PSFCH resource available at each transmission request time (S1560).

Figure 16:
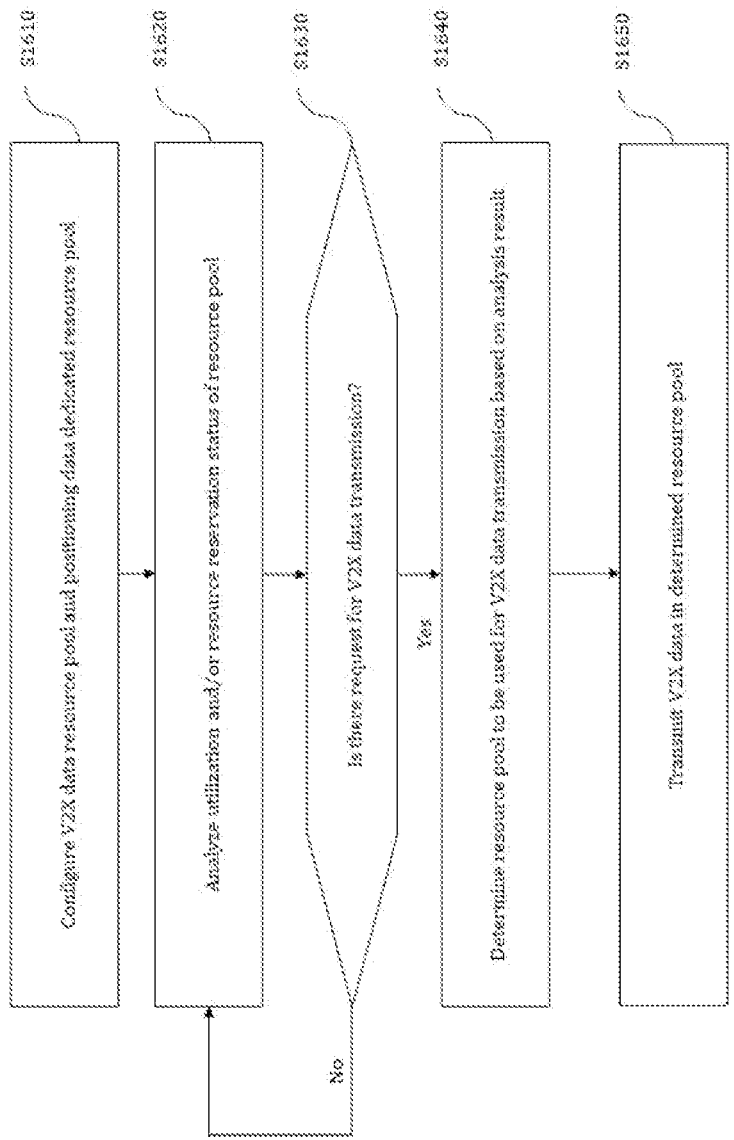
FIG. 16 is a diagram for explaining a method by which a neighboring UE transmits a response PRS when a V2X data slot is reserved at a time point when the response PRS needs to be transmitted according to a further embodiment of the present disclosure.

FIG. 16 is a flowchart illustrating a method by which a UE shares heterogeneous service resources in the NR-V2X system according to an embodiment.

Referring to FIG. 16, the UE may preconfigure a V2X data resource pool and a positioning data dedicated resource pool (S1610).

The UE may monitor and analyze the utilization and/or resource reservation statuses of the V2X data resource pool and positioning data dedicated resource pool (S1620). Here, the analyzing of the utilization and resource reservation statuses of the resource pools may be performed as described above in Embodiment 4.

When V2X data transmission is requested by higher layers, the UE may determine a resource pool to be used for the V2X data transmission based on the analysis result in step 1620 (S1640).

The UE may perform the V2X data transmission in the determined resource pool (S1650).

In the embodiment of FIG. 16, the sharing method for determining which resource pool among a V2X data resource pool and a positioning dedicated data resource pool is used for V2X data transmission based on the utilization of the resource pools has been described, but this is merely one embodiment. That is, in another embodiment, if there are positioning dedicated data resources not used or reserved by neighboring UEs, the UE may reserve and use the corresponding resources for V2X data transmission, regardless of the resource pool utilization.

Figure 17:
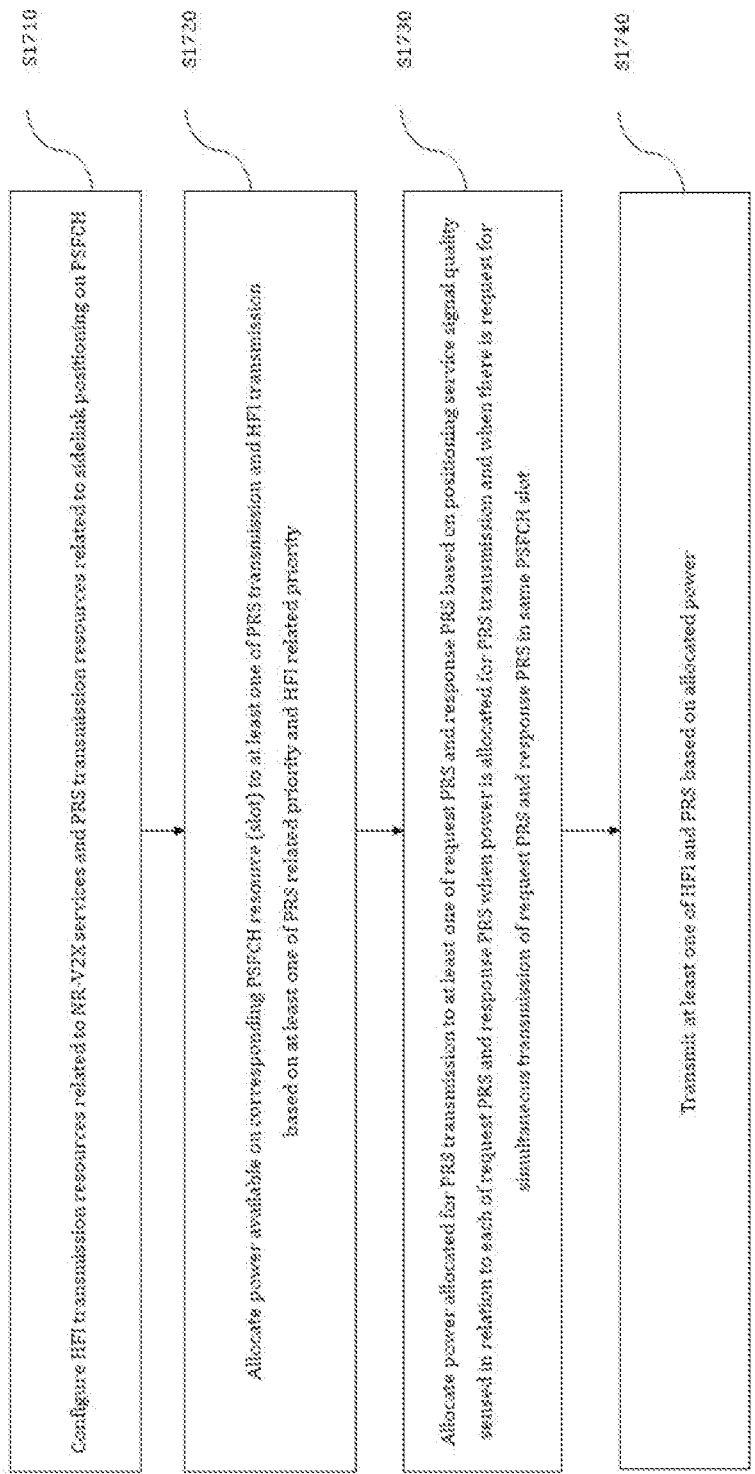
FIG. 17 is a flowchart for explaining a sidelink broadcast positioning procedure for an anchor node (AN) according to an embodiment.

FIG. 17 is a diagram for explaining a method by which a UE share powers in the NR-V2X communication system according to an embodiment.

Referring to FIG. 17, the UE may configure HFI transmission resources related to NR-V2X services and PRS transmission resources related to sidelink positioning on a PSFCH (S1710).

When there is a request for simultaneous transmission of a PRS and HFI, the UE may allocate power available on a corresponding PSFCH resource (slot) to at least one of PRS transmission and HFI transmission based on at least one of a PRS related priority and a HFI related priority (S1720).

When the power is allocated for the PRS transmission and when there is a request for simultaneous transmission of a request PRS and a response PRS in the same PSFCH slot, the UE may allocate the power allocated for the PRS transmission to at least one of the request PRS and the response PRS, based on a positioning service signal quality sensed in relation to each of the request PRS and the response PRS (S1730).

The UE may transmit at least one of the HFI and PRS on the corresponding PSFCH resource based on the allocated power (S1740).

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
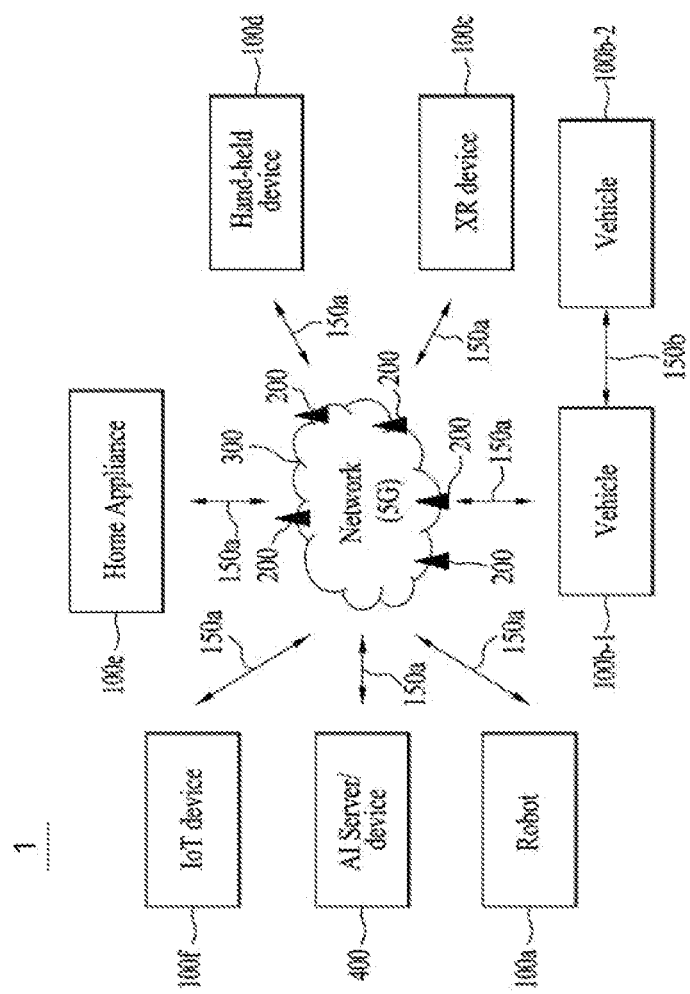
FIG. 18 illustrates a communication system applied to the present disclosure.

FIG. 18 illustrates a communication system applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device to which Present Disclosure is Applied

Figure 19:
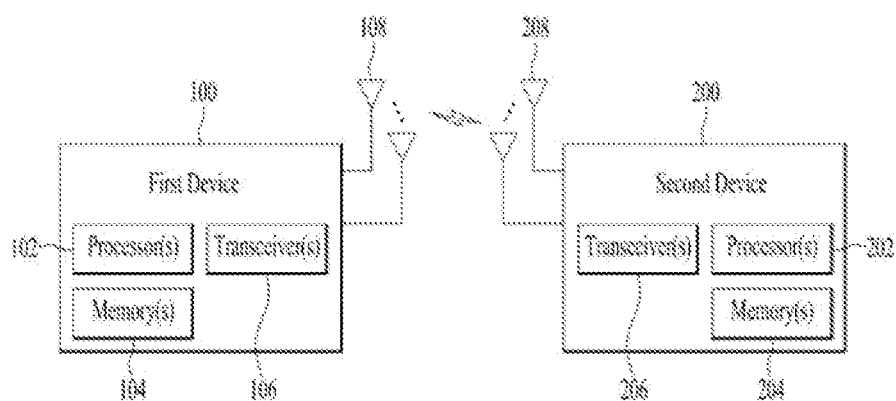
FIG. 19 illustrates wireless devices applicable to the present disclosure.

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100, the second wireless device 200} may correspond to {the wireless device 100x, the base station 200} and/or {the wireless device 100x, the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE or the vehicle may include the processor(s) 102 and the memory(s) 104 that are connected to the RF transceiver. The memory(s) 104 may contain at least one program for performing an operation related to the embodiments described with reference to FIGS. 12 to 17.

The processor(s) 102 may be configured to: configure a resource for transmitting a PRS related to sidelink positioning on a PSFCH; when there is a request for simultaneous transmission of the PRS and HFI related to NR-V2X services, allocate power available in a PSFCH slot for transmission of at least one of the PRS and the HFI based on at least one of a priority related to the PRS and a priority related to the HFI; and transmit the at least one of the PRS and the HFI based on the allocated power. The processor(s) 102 may be configured to perform the power and resource sharing methods described above with reference to Embodiments 1 to 4 and FIGS. 12 to 17 based on the program included in the memory(s) 104 in order to efficiently perform an operation of determining the absolute position (or relative position) of the UE.

A chipset including the processor(s) 102 and the memory(s) 104 may be configured. In this case, the chipset may include at least one processor and at least one memory operatively connected to the at least one processor and allowing the at least one processor to perform operations when being executed. The operations may include: configuring a resource for transmitting HFI related to NR-V2X services and a resource for transmitting a PRS related to sidelink positioning on a PSFCH; when there is a simultaneous transmission of the PRS and the HFI, allocating power based on at least one of a priority related to the PRS and a priority related to the HFI; and transmitting at least one of the PRS and the HFI based on the allocated power. The processor(s) 102 may be configured to perform the power and resource sharing methods described above with reference to Embodiments 1 to 4 and FIGS. 12 to 17 based on the program included in the memory(s) 104 in order to efficiently perform an operation of determining the absolute position (or relative position) of the UE.

A computer readable recording medium including at least computer program for allowing the at least one processor to perform operations may be provided. The operations may include: configuring a resource for transmitting HFI related to NR-V2X services and a resource for transmitting a PRS related to sidelink positioning on a PSFCH; when there is a request for simultaneous transmission of the PRS and the HFI, allocating power based on at least one of a priority related to the PRS and a priority related to the HFI; and transmitting at least one of the PRS and the HFI based on the allocated power. The processor(s) 102 may be configured to perform the power and resource sharing methods described above with reference to Embodiments 1 to 4 and FIGS. 12 to 17 based on the program included in the memory(s) 104 in order to efficiently perform an operation of determining the absolute position (or relative position) of the UE.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor(s) 202 may be configured to: configure a resource for transmitting a PRS related to sidelink positioning on a PSFCH; when there is a simultaneous transmission of the PRS and HFI related to NR-V2X services, allocate power available in a PSFCH slot for transmission of at least one of the PRS and the HFI based on at least one of a priority related to the PRS and a priority related to the HFI; and transmit the at least one of the PRS and the HFI based on the allocated power. The processor(s) 202 may be configured to perform the power and resource sharing methods described above with reference to Embodiments 1 to 4 and FIGS. 12 to 17 based on the program included in the memory(s) 204 in order to efficiently perform an operation of determining the absolute position (or relative position) of the UE.

A chipset including the processor 202 and the memory 204 may be configured. In this case, the chipset may include at least one processor and at least one memory operatively connected to the at least one processor and allowing the at least one processor to perform operations when being executed. The operations may include: configuring a resource for transmitting HFI related to NR-V2X services and a resource for transmitting a PRS related to sidelink positioning on a PSFCH; when there is a request for simultaneous transmission of the PRS and the HFI, allocating power based on at least one of a priority related to the PRS and a priority related to the HFI; and transmitting at least one of the PRS and the HFI based on the allocated power. The processor(s) 202 may be configured to perform the power and resource sharing methods described above with reference to Embodiments 1 to 4 and FIGS. 12 to 17 based on the program included in the memory(s) 204 in order to efficiently perform an operation of determining the absolute position (or relative position) of the UE.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Application of Wireless Device Applicable to the Present Disclosure

Figure 20:
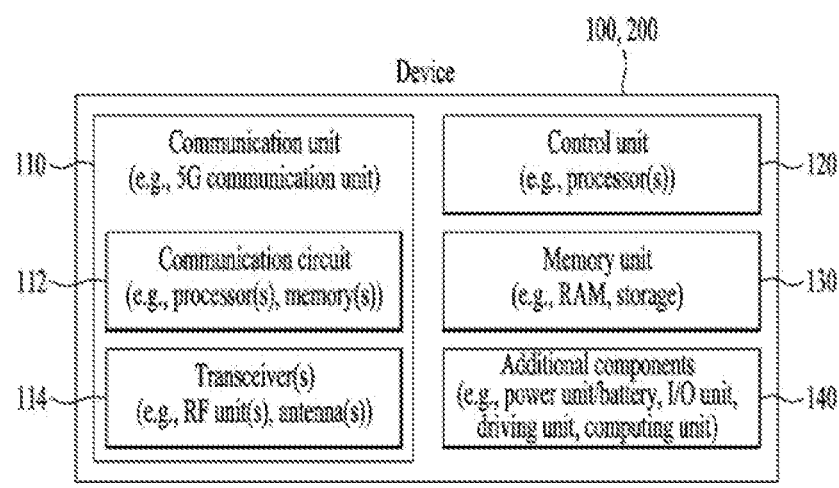
FIG. 20 illustrates another example of a wireless device applicable to the present disclosure.

FIG. 20 illustrates another example of a wireless device applied to the present disclosure. The wireless device may be implemented in various forms according to a use-case/service (refer to FIG. 28).

Referring to FIG. 20 wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a FinTech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 21:
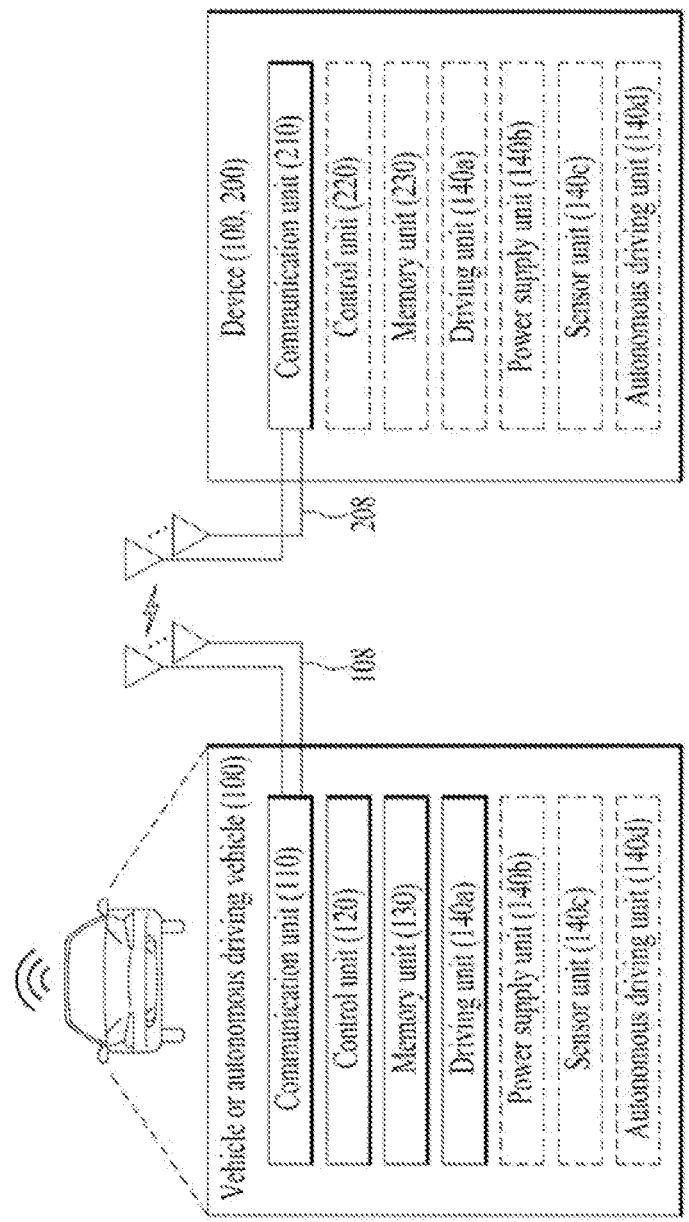
FIG. 21 illustrates a vehicle or an autonomous driving vehicle applied to the present disclosure.

Example of a Vehicle or an Autonomous Driving Vehicle to which the Present Disclosure is Applied FIG. 21 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the present disclosure may include at least one of ZigBee, Bluetooth, or Low Power Wide Area Network (LPWAN) in consideration of low power communication and is not limited to the aforementioned terms. For example, the ZigBee technology may create a personal area network (PAN) related to small/low-power digital communication based on various standards such as IEEE 802.15.4 and so on, and the ZigBee technology may be called by various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user The embodiments according to the present disclosure may be implemented by various means, for example, hardware, firmware, software, or a combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure may be applied to various devices for communication through sidelink

The invention claimed is:

1. A method of sharing power by a user equipment (UE) in a new radio vehicle-to-everything (NR-V2X) communication system, the method comprising:
configuring a resource for transmitting hybrid automatic repeat request acknowledgement (HARQ-ACK) feedback information (HFI) related to NR-V2X services and a resource for transmitting a positioning reference signal (PRS) related to sidelink positioning on a physical sidelink feedback channel (PSFCH);
based on a request for simultaneous transmission of the PRS and the HFI, allocating power based on at least one of a priority related to the PRS and a priority related to the HFI; and
transmitting at least one of the PRS and the HFI based on the allocated power.

2. The method of claim 1, wherein the resource for transmitting the PRS includes a resource for transmitting a request PRS and a resource for transmitting a response PRS, and
wherein based on a request for simultaneous transmission of the request PRS and the response PRS in a same PSFCH slot, power allocated to the PRS is allocated for transmission of at least one of the request PRS and the response PRS based on at least one of a priority related to the request PRS and a priority related to the response PRS.

3. The method of claim 2, wherein based on both of the priority related to the request PRS and the priority related to the response PRS being greater than or less than thresholds predefined in relation thereto, same power is allocated regardless of the priorities, power is allocated in proportion to the priorities, or power preconfigured for the request PRS and the response PRS is allocated.

4. The method of claim 3, comprising:
configuring a positioning dedicated data resource pool;
sensing utilization of a V2X data resource pool; and
based on a request for V2X data transmission, determining a resource pool to be used for the V2X data transmission based on the sensed utilization of the V2X data resource pool.

5. The method of claim 4, wherein based on determination of the positioning dedicated data resource pool as the resource pool to be used for the V2X data transmission, a V2X data indicator indicating that data transmitted in the positioning dedicated data resource pool is V2X data is transmitted in first-stage sidelink control information (SCI) on a physical sidelink control channel (PSCCH) and/or second-stage SCI on a physical sidelink shared channel (PSSCH).

6. The method of claim 5, wherein based on a request for positioning data transmission occurring during the V2X data transmission in the positioning dedicated data resource pool, a positioning dedicated data resource allocated for the V2X data transmission is preempted for the positioning data transmission based on a priority of positioning data.

7. The method of claim 6, wherein based on an available positioning dedicated data resource being within a latency budget for the positioning data transmission, the positioning dedicated data resource allocated for the V2X data transmission is not preempted.

8. The method of claim 2, wherein based on both of the priority related to the PRS and the priority related to the HFI being greater than or less than thresholds predefined in relation thereto, i) same power is allocated regardless of the priorities, ii) power is allocated in proportion to the priorities, or iii) power preconfigured for the request PRS and the response PRS is allocated.

9. The method of claim 1, wherein the resource for transmitting the PRS is configured on the PSFCH in first-stage sidelink control information (SCI) on a physical sidelink control channel (PSCCH) and/or second-stage SCI on a physical sidelink shared channel (PSSCH).

10. A method of sharing power by a user equipment (UE) in a new radio vehicle-to-everything (NR-V2X) communication system, the method comprising:
configuring a resource for transmitting hybrid automatic repeat request acknowledgement (HARQ-ACK) feedback information (HFI) related to NR-V2X services and a resource for transmitting a positioning reference signal (PRS) related to sidelink positioning on a physical sidelink feedback channel (PSFCH);
based on a request for simultaneous transmission of the PRS and the HFI, allocating power available in a PSFCH slot for transmission of at least one of the PRS and the HFI based on at least one of a priority related to the PRS and a priority related to the HFI; and
transmitting the at least one of the PRS and the HFI based on the allocated power,
wherein based on a request for simultaneous transmission of a request PRS and a response PRS in a same PSFCH slot occurring after the power is allocated for the PRS transmission, the power allocated for the PRS transmission is allocated to at least one of the request PRS and the response PRS based on a positioning service signal quality sensed in relation to each of the request PRS and the response PRS.

11. A user equipment (UE) configured to perform sidelink on-demand positioning in a new radio vehicle-to-everything (NR-V2X) communication system, the UE comprising:
a radio frequency (RF) transceiver; and
a processor connected to the RF transceiver,
wherein the processor is configured to:
configure a resource for transmitting a positioning reference signal (PRS) related to the sidelink positioning on a physical sidelink feedback channel (PSFCH);
based on a request for simultaneous transmission of the PRS and hybrid automatic repeat request acknowledgement (HARQ-ACK) feedback information (HFI) related to NR-V2X services, allocate power available in a PSFCH slot for transmission of at least one of the PRS and the HFI based on at least one of a priority related to the PRS and a priority related to the HFI; and transmit the at least one of the PRS and the HFI based on the allocated power.

12. The UE of claim 11, wherein the resource for transmitting the PRS includes a resource for transmitting a request PRS and a resource for transmitting a response PRS, and wherein based on a request for simultaneous transmission of the request PRS and the response PRS in a same PSFCH slot, the processor is configured to allocate power allocated to the PRS for transmission of at least one of the request PRS and the response PRS based on at least one of a priority related to the request PRS and a priority related to the response PRS.

13. The UE of claim 12, wherein based on both of the priority related to the request PRS and the priority related to the response PRS being greater than or less than thresholds predefined in relation thereto, the processor is configured to allocate same power regardless of the priorities, allocate power in proportion to the priorities, or allocate power preconfigured for the request PRS and the response PRS.

14. The UE of claim 13, wherein the processor is configured to:
configure a positioning dedicated data resource pool;
sense utilization of a V2X data resource pool; and
based on a request for V2X data transmission, determine a resource pool to be used for the V2X data transmission based on the sensed utilization of the V2X data resource pool.

15. The UE of claim 14, wherein based on determination of the positioning dedicated data resource pool as the resource pool to be used for the V2X data transmission, the processor is configured to transmit a V2X data indicator indicating that data transmitted in the positioning dedicated data resource pool is V2X data in first-stage sidelink control information (SCI) on a physical sidelink control channel (PSCCH) and/or second-stage SCI on a physical sidelink shared channel (PSSCH).

16. The UE of claim 15, wherein based on a request for positioning data transmission occurring during the V2X data transmission in the positioning dedicated data resource pool, the processor is configured to preempt a positioning dedicated data resource allocated for the V2X data transmission for the positioning data transmission based on a priority of positioning data.

17. The UE of claim 16, wherein based on an available positioning dedicated data resource being within a latency budget for the positioning data transmission, the processor is configured to not to preempt the positioning dedicated data resource allocated for the V2X data transmission.

18. The UE of claim 12, wherein based on both of the priority related to the PRS and the priority related to the HFI being greater than or less than thresholds predefined in relation thereto, i) same power is allocated regardless of the priorities, ii) power is allocated in proportion to the priorities, or iii) power preconfigured for the request PRS and the response PRS is allocated.

19. The UE of claim 11, wherein the resource for transmitting the PRS is configured on the PSFCH in first-stage sidelink control information (SCI) on a physical sidelink control channel (PSCCH) and/or second-stage SCI on a physical sidelink shared channel (PSSCH).

* * * * *